(12) United States Patent
Gundavelli et al.

(10) Patent No.: US 12,021,654 B2
(45) Date of Patent: *Jun. 25, 2024

(54) TECHNIQUES FOR EXTENDING A CELLULAR QUALITY OF SERVICE BEARER THROUGH AN ENTERPRISE FABRIC

(71) Applicant: Cisco Technology, Inc., San Jose, CA (US)

(72) Inventors: Srinath Gundavelli, San Jose, CA (US); Sangram Kishore Lakkaraju, Bangalore (IN); Alberto Rodriguez Natal, Mountain View, CA (US); Fabio R. Maino, Palo Alto, CA (US); Timothy Peter Stammers, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,666

(22) Filed: Oct. 30, 2023

(65) Prior Publication Data

US 2024/0080223 A1 Mar. 7, 2024

Related U.S. Application Data

(63) Continuation of application No. 17/949,422, filed on Sep. 21, 2022, now Pat. No. 11,811,557, which is a
(Continued)

(51) Int. Cl.
*H04L 12/46* (2006.01)
*H04L 45/74* (2022.01)
(Continued)

(52) U.S. Cl.
CPC ...... *H04L 12/4633* (2013.01); *H04L 12/4641* (2013.01); *H04L 45/74* (2013.01);
(Continued)

(58) Field of Classification Search
CPC . H04L 12/4633; H04L 12/4641; H04L 45/74; H04L 47/24; H04L 49/25;
(Continued)

(56) References Cited

U.S. PATENT DOCUMENTS 8,578,035 B2 11/2013 Miklos et al.
8,982,862 B2 3/2015 Gu
(Continued)

FOREIGN PATENT DOCUMENTS

EP 3215953 B1 2/2019
EP 3044996 B1 1/2020
(Continued)

OTHER PUBLICATIONS

Maino F., et al., "Generic Protocol Extension for VXLAN, draft-ietf-nvo3-vxlan-gpe-05," Network Working Group, Internet Engineering Task Force (IETF) Internet-Draft, Oct. 30, 2017, 17 Pages.
(Continued)

*Primary Examiner* — Rina C Pancholi
(74) *Attorney, Agent, or Firm* — Edell, Shapiro & Finnan, LLC

(57) ABSTRACT

Techniques are described for extending a cellular quality of service bearer through an enterprise fabric network. In one example, a method obtaining, by a first switch of a network, a packet to be delivered to a client connected to the network via a cellular access point; identifying quality of service (QoS) bearer information associated with the packet, wherein the QoS bearer information is associated with a radio access bearer for the client and the QoS bearer information comprises a bearer indicator and a QoS class
(Continued)

identifier; providing a fabric tunnel encapsulation for the packet, wherein the bearer indicator and the QoS class identifier are included within the fabric tunnel encapsulation of the packet; and forwarding the packet within the fabric tunnel encapsulation toward a second switch of the network via a fabric tunnel, wherein the cellular access point is connected to the network via the second switch.

27 Claims, 20 Drawing Sheets

Related U.S. Application Data continuation of application No. 16/720,755, filed on Dec. 19, 2019, now Pat. No. 11,582,066.

(51) Int. Cl.
| | |
|---|---|
| H04L 47/24 | (2022.01) |
| H04L 49/25 | (2022.01) |
| H04L 61/2592 | (2022.01) |
| H04L 69/22 | (2022.01) |
| H04L 101/622 | (2022.01) |

(52) U.S. Cl.
CPC .............. H04L 47/24 (2013.01); H04L 49/25 (2013.01); H04L 61/2592 (2013.01); H04L 69/22 (2013.01); H04L 2101/622 (2022.05)

(58) Field of Classification Search
CPC . H04L 61/2592; H04L 69/22; H04L 61/6022; H04L 12/14; H04L 12/1403; H04L 65/80; H04L 12/1407; H04W 76/11; H04W 4/24; H04W 76/12; H04M 15/66; H04M 15/8016; H04M 15/61
See application file for complete search history.

(56) References Cited

U.S. PATENT DOCUMENTS

| | | | |
|---|---|---|---|
| 9,055,557 B1 | 6/2015 | Bayar et al. | |
| 9,473,986 B2 | 10/2016 | Tomici et al. | |
| 9,838,314 B1 | 12/2017 | Hooda et al. | |
| 10,028,167 B2 | 7/2018 | Calin et al. | |
| 10,033,766 B2 | 7/2018 | Gupta et al. | |
| 10,164,795 B1* | 12/2018 | Madasamy | H04L 12/4633 |
| 10,298,774 B2 | 5/2019 | Russell et al. | |
| 10,448,352 B1* | 10/2019 | Grayson | H04W 8/08 |
| 10,547,544 B2* | 1/2020 | Edsall | H04L 49/111 |
| 10,791,535 B1 | 9/2020 | Grayson et al. | |
| 10,812,377 B2 | 10/2020 | Stammers et al. | |
| 10,932,322 B2* | 2/2021 | Bull | H04W 92/02 |
| 2012/0120831 A1* | 5/2012 | Gonsa | H04W 76/15 370/252 |
| 2013/0021905 A1 | 1/2013 | Schramm | |
| 2013/0265997 A1 | 10/2013 | Gu | |
| 2013/0318345 A1* | 11/2013 | Hengeveld | H04L 45/22 713/168 |
| 2015/0003455 A1 | 1/2015 | Haddad et al. | |
| 2015/0063166 A1 | 3/2015 | Sif et al. | |
| 2015/0071053 A1 | 3/2015 | Kempf et al. | |
| 2015/0117256 A1* | 4/2015 | Sabaa | H04L 45/68 370/254 |
| 2015/0215220 A1 | 7/2015 | Yiu et al. | |
| 2015/0215978 A1* | 7/2015 | Casati | H04W 76/12 370/329 |
| 2015/0245249 A1* | 8/2015 | Grootwassink | H04W 28/12 370/328 |
| 2016/0037328 A1 | 2/2016 | Raveendran | |
| 2016/0105336 A1 | 4/2016 | Sinha et al. | |
| 2016/0212778 A1 | 7/2016 | Grootwassink et al. | |
| 2016/0227467 A1 | 8/2016 | Tomici et al. | |
| 2016/0227471 A1 | 8/2016 | De Foy et al. | |
| 2016/0262044 A1 | 9/2016 | Calin et al. | |
| 2016/0302110 A1* | 10/2016 | Baboescu | H04W 28/0967 |
| 2017/0026417 A1 | 1/2017 | Ermagan et al. | |
| 2017/0289046 A1 | 10/2017 | Faccin et al. | |
| 2017/0359749 A1 | 12/2017 | Dao | |
| 2017/0366401 A1 | 12/2017 | Jiang et al. | |
| 2018/0091471 A1 | 3/2018 | Hooda et al. | |
| 2018/0097722 A1* | 4/2018 | Callard | H04L 12/4641 |
| 2018/0098265 A1* | 4/2018 | Tomici | H04W 36/26 |
| 2018/0139240 A1 | 5/2018 | Voit et al. | |
| 2018/0213472 A1 | 7/2018 | Ishii et al. | |
| 2019/0268973 A1* | 8/2019 | Bull | H04W 92/02 |
| 2020/0092423 A1 | 3/2020 | Qiao et al. | |
| 2020/0120022 A1 | 4/2020 | Stammers et al. | |
| 2020/0186477 A1 | 6/2020 | Pularikkal et al. | |
| 2020/0196183 A1* | 6/2020 | Mehta | H04W 76/15 |
| 2020/0288424 A1 | 9/2020 | Grayson et al. | |
| 2020/0314694 A1* | 10/2020 | Yu | H04L 49/70 |
| 2020/0344662 A1 | 10/2020 | Maino et al. | |
| 2020/0366677 A1 | 11/2020 | Draznin et al. | |
| 2021/0045193 A1 | 2/2021 | Mishra et al. | |
| 2021/0076250 A1 | 3/2021 | Wang et al. | |
| 2021/0185752 A1* | 6/2021 | Samuel | H04L 63/0272 |
| 2021/0274575 A1* | 9/2021 | Talebi Fard | H04W 76/12 |
| 2022/0338054 A1* | 10/2022 | Mehta | H04L 47/24 |

FOREIGN PATENT DOCUMENTS

| | | |
|---|---|---|
| WO | 2012025031 A1 | 3/2012 |
| WO | 2015038911 A1 | 3/2015 |
| WO | 2017176399 A1 | 10/2017 |
| WO | 2019125843 A1 | 6/2019 |
| WO | 2020040752 A1 | 2/2020 |
| WO | 2020046380 A1 | 3/2020 |
| WO | 2020148062 A1 | 7/2020 |
| WO | 2021017669 A1 | 2/2021 |

OTHER PUBLICATIONS

Matsushima S., et al., Segment Routing IPv6 for Mobile User Plane draft-ietf-dmm-srv6-mobile-uplane-02, DMM Working Group, Internet-Draft, Intended status: Standards Track, Jul. 2, 2018, 30 pages.
Meyer D., et al., "LISP Mobile Node, draft-meyer-lisp-mn-04.txt," Network Working Group, Internet-Draft, Intended status: Informational, Oct. 25, 2010, 22 Pages.
Natal A.R., et al., "MS-Originated SMRs," draft-rodrigueznatal-lisp-ms-smr-08, LISP Working Group, Internet-Draft, Intended status: Informational, Apr. 4, 2019, 7 Pages.
Nokia: "7750 Service Router Virtualized Service Router", BNG Cups User Plane Function Guide Release 20.10.R1, Issue: 01, downloaded Oct. 26, 2020, 60 pages.
Perkins C., "IP Encapsulation Within IP," Network Working Group, Request for Comment: 2003, Category: Standards Track, Oct. 1996, 14 Pages.
Reeve D.C., "A New Blueprint for Network QoS," the University of Kent at Canterbury, Aug. 2003, 217 Pages.
Smith M., et al., "Scalable-Group Tag exchange Protocol (SXP) draft-smith-kandula-sxp-07", Network Working Group, Internet-Draft, Apr. 3, 2019, 56 pages.
Smith M., et al., "Scalable-Group Tag eXchange Protocol (SXP) draft-smith-kandula-sxp-10", Network Working Group, Internet-Draft, May 24, 2020, 56 pages.
Smith M., "VXLAN Group Policy Option, draft-smith-vxlan-group-policy-04," Internet Engineering Task Force, Internet-Draft, Intended status: Informational, Oct. 20, 2017, 6 Pages.
Solarwinds: "NetFlow Collector," Cisco NetFlow Collector Software, SolarWinds, downloaded Feb. 12, 2021, 6 pages.
Solved: "Radius LDAP mapping for SGT," Cisco Community, downloaded Feb. 12, 2021, 5 pages.
Wakikawa R., et al., "IPv4 Support for Proxy Mobile IPv6," Internet Engineering Task Force (IETF), Request for Comments: 5844, Category: Standards Track, ISSN: 2070-1721, May 2010, 49 pages.
Xia F., et al., "Quality of Service Marking in Virtual eXtensible Local Area Network", draft-xia-nvo3-vxlan-qosmarking-01.txt, , Network Working Group, Internet-Draft, Nov. 10, 2014, 9 pages.

(56) References Cited

OTHER PUBLICATIONS

3GGP: "3rd Generation Partnership Project; Technical Specification Group Services and System Aspects; System Architecture for the 5G System (5GS); Stage 2 (Release 16)," 3GPP TS 23.501 V16.2.0, Sep. 2019, 391 Pages.

3GPP: "3rd Generation Partnership Project; Technical Specification Group Core Network and Terminals; 3GPP Evolved Packet System (EPS); Evolved General Packet Radio Service (GPRS) Tunnelling Protocol for Control plane GTPv2-C); Stage 3 (Release 16)," 3GPP TS 29.274 V16.1.0, Sep. 2019, 400 Pages.

3GPP: "3rd Generation Partnership Project; Technical Specification Group Core Network and Terminals; 5G System; Session Management Policy Control Service; Stage 3 (Release 16)," 3GPP TS 29.512 V16.2.0, Sep. 2019, 168 pages.

3GPP: "3rd Generation Partnership Project; Technical Specification Group Core Network and Terminals; Mobile radio Interface Layer3 Specification; Core Network Protocols; Stage 3 (Release16)," 3GPP TS 24.008 V16.2.0, Sep. 2019, 793 Pages.

3GPP: "3rd Generation Partnership Project; Technical Specification Group Core Network and Terminals; Non-Access-Stratum (NAS) Protocol for Evolved Packet System (EPS); Stage 3 (Release 13)," 3GPP TS 24.301 V13.7.0, Sep. 2016, 458 pages.

3GPP: "3rd Generation Partnership Project; Technical Specification Group Core Network and Terminals; Policy and Charging Control (PCC); Reference points (Release 16)," 3GPP TS 29.212 V16.0.0, Jun. 2019, 285 pages.

3GPP: "3rd Generation Partnership Project; Technical Specification Group Core Network and Terminals;5G System; Network Function Repository Services; Stage 3 (Release 16)," 3GPP TS 29.510 V16.1.1, Oct. 2019, 150 pages.

3GPP: "3rd Generation Partnership Project; Technical Specification Group Radio Access Network; Evolved Universal Terrestrial Radio Access Network (E-UTRAN); Architecture description (Release 15)," 3GPP TS 36.401 V15.1.0, Dec. 2018, 21 Pages.

3GPP: "3rd Generation Partnership Project; Technical Specification Group Radio Access Network; UTRAN lub/lur Interface User Plane Protocol for DCH Data Streams (Release 5)," 3GPP TS 25.427 V5.5.0, Jun. 2005, 34 Pages.

3GPP: "3rd Generation Partnership Project; Technical Specification Group Services and System Aspects; Policy and Charging Control Architecture (Release 16)," 3GPP TS 23.203 V16.1.0, Jun. 2019, 263 Pages.

3GPP: "3rd Generation Partnership Project; Technical Specification Group Services and System Aspects; Policy and Charging Control Framework for the 5G System (5GS); Stage 2 (Release 16)," 3GPP TS 23.503 V16.2.0, Sep. 2019, 104 Pages.

3GPP, "3rd Generation Partnership Project; Technical Specification Group Services and System Aspects; Procedures or the 5G System (5GS); Stage 2 (Release 16)," 3GPP TS 23.502 V16.2.0, Sep. 2019, 525 Pages.

3GPP: "3rd Generation Partnership Project; Technical Specification Group Core Network and Terminals; Interface between the Control Plane and the User Plane Nodes; Stage 3 (Release 16)," 3GPP TS 29.244 V16.1.0, Sep. 2019, 243 pages.

Aboba B., et al., "The Network Access Identifier," Network Working Group, Request for Comments: 4282, Obsoletes: 2486, Category: Standards Track, Dec. 2005, 16 Pages.

Ahmadi, S, "Temporary Identity," Science Direct, https://www.sciencedirect.com/topics/computer-science/temporary-identity, retrieved Oct. 14, 2019, 16 pages.

Arkko, J., et al., "Extensible Authentication Protocol Method for 3rd Generation Authentication and Key Agreement (EAP-AKA)", Network Working Group, Request for Comments: 4187, Category: Informational, Jan. 2006, 79 pages.

Arkko, J., et al., "Improved Extensible Authentication Protocol Method for 3rd Generation Authentication and Key Agreement (EAP-AKA')", Network Working Group, Request for Comments: 5448, Updates: 4187, Category: Informational, May 2009, 29 pages.

Blake, S., et al., "An Architecture for Differentiated Services", Network Working Group, Request for Comments: 2475, Category: Informational, Dec. 1998, 36 pages.

Calhoun P., Ed., et al., "Control And Provisioning of Wireless Access Points (CAPWAP) Protocol Specification", Network Working Group, Request for Comments: 5415, Category: Standards Track, Mar. 2019, 155 pages.

Cisco, "Configuring VXLAN QoS," downloaded Dec. 13, 2019, 14 pages.

Cisco, "SD-Access Wireless Integration", Principal TME, Enterprise Networking Business, BRKEWN-2020, Mar. 6-9, 2018, 122 pages.

Cisco: "Deploying Campus Security Group Tags," Cisco Live, BRKCRS-2662, 2013, 78 Pages, Retrieved on Mar. 4, 2019, Retrieved from URL: https://www.alcatron.net/Cisco%20Live%202013%20Melbourne/Cisco%20Live%20Content/Network%20Infrastructure%20And%20Systems/BRKCRS-2662%20%20Deploying%20Campus%20Security%20Group%20Tags.pdf.

"Cisco Enterprise Networks Catalog vol. 5: Europe, Middle East, Africa, Russia," Cisco, The Network Intuitive, 2017, 108 Pages.

Cisco, "HeNBGW Qci Dscp Mapping Table Configuration Mode Commands", downloaded Dec. 13, 2019, 8 pages.

Cisco, "Locator ID Separation Protocol (LISP) Overview", downloaded Dec. 13, 2019, 8 pages.

Cisco, "Locator ID Separation Protocol (LISP) VM Mobility Solution," Printed in USA C11-539588, Mar. 28, 2011, 73 pages.

Cisco, "Software-Defined Access 1.0," Cisco Systems, Inc., Whitepaper, San Jose, CA, USA, May 2018, 35 Pages, Retrieved from URL: https://www.cisco.Com/c/dam/en/us/solutions/collateral/enterprise-networks/software-defined-access/white-paper-c11-740585.pdf.

Cisco: "Software-Defined Access Design Guide," Solution 1.2, Dec. 2018, 45 Pages.

Cisco, "Software-Defined Access Wireless", downloaded Dec. 13, 2019, 12 pages.

Cisco, "Overview of TrustSec", Ordering Guide, Jan. 2014, 58 pages.

Cisco, "RADIUS Dictionaries and Attribute Definitions", downloaded Jul. 1, 2020, 358 pages.

Cisco: "VXLAN Overview: Cisco Nexus 9000 Series Switches," White Paper, C11-729383-01, Jan. 2015, 10 Pages.

Ekstrom H., "Qos control in the 3GPP Evolved packet system," IEEE communications magazine, Feb. 2009, 8 pages.

Farinacci D., et al., "Generic Routing Encapsulation (GRE)," Network Working Group, Request for Comments: 2784, Category: Standards Track, The Internet Society, Reston, VA, USA, Mar. 2000, 9 pages.

Farinacci D., et al., "The Locator/ID Separation Protocol (LISP)," Internet Engineering Task Force (IETF), Category: Experimental, ISSN: 2070-1721, Request for Comments: 6830, Jan. 2013, 75 Pages.

Fuller V., et al., "Locator/ID Separation Protocol (LISP) Map-Server Interface," Internet Engineering Task Force (IETF), Request for Comments: 6833, Category: Experimental, ISSN: 2070-1721, Jan. 2013, 13 Pages.

Geller M., et al., "5G Security Innovation With Cisco," Cisco Public, Whitepaper, Retrieved on May 14, 2018, 29 Pages.

Gemalto: "A New Trust Model For The 5G Era," Apr. 2018, 14 Pages.

GSM Association: "Guidelines for IPX Provider networks (Previously Inter-Service Provider IP Backbone Guidelines)," Version 14.0, Aug. 1, 2018, 52 pages.

Gundavelli S., et al., "Proxy Mobile IPv6," Network Working Group, Aug. 2008, 92 Pages.

Hafner V., "Cisco Campus Fabric Introduction," Cisco Connect, Campus Fabric Design Guide, Apr. 5-7, 2017, 65 Pages.

Hanks S., et al., "Generic Routing Encapsulation (GRE)", Network Working Group, Request for Comments: 1701, Category: Informational, Oct. 1994, 8 pages.

Hill C., et al., "Cisco Software-Defined Access Enabling Intent-based Networking", Cisco, downloaded Jan. 22, 2019, 154 pages.

International Search Report and Written Opinion in Counterpart International Application No. PCT/US2020/064784, dated Mar. 19, 2021, 13 Pages.

(56) References Cited

OTHER PUBLICATIONS

Juniper: "Juniper Networks Delivers EVPN-VXLAN Fabric to Connect Enterprise Data Center and Campus Networks," Jun. 28, 2018, 4 Pages.

Kar S., "Virtual Extensible LAN and Ethernet Virtual Private Network", downloaded Dec. 13, 2019, 48 pages.

Liebsch M., et al., "Quality-of-Service Option for Proxy Mobile IPv6", Internet Engineering Task Force (IETF), Request for Comments: 7222, Category: Standards Track, ISSN: 2070-1721, May 2014, 58 pages.

Longley J., et al., "Securing the 5G Core (5GC) and Evolved Packet Core (EPC) with Cisco Security", Cisco, White Paper, downloaded Jul. 20, 2020, 18 pages.

"MAC Address," Available on URL: https://www.askapache.com/s/u.askapache.com/2009/11/MACaddress.png, downloaded Dec. 13, 2019, 1 Page.

Mahalingam M., et al., "Virtual extensible Local Area Network (VXLAN): A Framework for Overlaying Virtualized Layer 2 Networks over Layer 3 Networks," Independent Submission, RFC 7348, Retrieved on URL: http://www.hip.at/doc/rfc/rfc7348.html, Aug. 2014, 22 pages.

Examination Report in counterpart European Application No. 20 830 044.2-1216, dated Jan. 4, 2024, 7 pages.

\* cited by examiner

TECHNIQUES FOR EXTENDING A CELLULAR QUALITY OF SERVICE BEARER THROUGH AN ENTERPRISE FABRIC

PRIORITY CLAIM

This application is a continuation of and claims the benefit of priority to U.S. patent application Ser. No. 17/949,422, filed Sep. 21, 2022, which application is a continuation of and claims the benefit of priority to U.S. patent application Ser. No. 16/720,755, filed Dec. 19, 2019, now U.S. Pat. No. 11,582,066, the entire contents of which applications are incorporated herein by reference.

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of communication resources becomes more critical. In particular, there are significant challenges related to providing cellular Quality of Service (QoS) support within enterprise networking environments.

DESCRIPTION OF EXAMPLE EMBODIMENTS

Overview

Presented herein are techniques for providing dynamic Quality of Service (QoS) support to a client connected to an enterprise private access (e.g., cellular) network of a software-defined access (SDA) enterprise fabric. Techniques presented herein provide interworking between SDA/enterprise fabric data and control plane elements as well as between a cellular control plane function (referred to herein as a cellular termination function (CTF)) to provide for the creation and/or deletion of radio and core network QoS bearer(s) by extending the techniques in which the Locator/Identity (ID) Separation Protocol (LISP) control plane is used for an SDA/enterprise fabric. With these extensions, a QoS bearer (e.g., a certain QoS classification) can be extended from a client to the SDA/enterprise fabric domain border; thereby providing end-to-end QoS and bringing a unique value to the SDA/enterprise fabric.

In an example embodiment, a method is provided that includes obtaining, by a first switch of a network, a packet to be delivered to a client connected to the network via a cellular access point; identifying quality of service (QoS) bearer information associated with the packet, wherein the QoS bearer information is associated with a radio access bearer for the client and the QoS bearer information comprises a bearer indicator and a QoS class identifier; providing a fabric tunnel encapsulation for the packet, wherein the bearer indicator and the QoS class identifier are included within the fabric tunnel encapsulation of the packet; and forwarding the packet within the fabric tunnel encapsulation toward a second switch of the network via a fabric tunnel, wherein the cellular access point is connected to the network via the second switch.

Example Embodiments

Figure 1A:
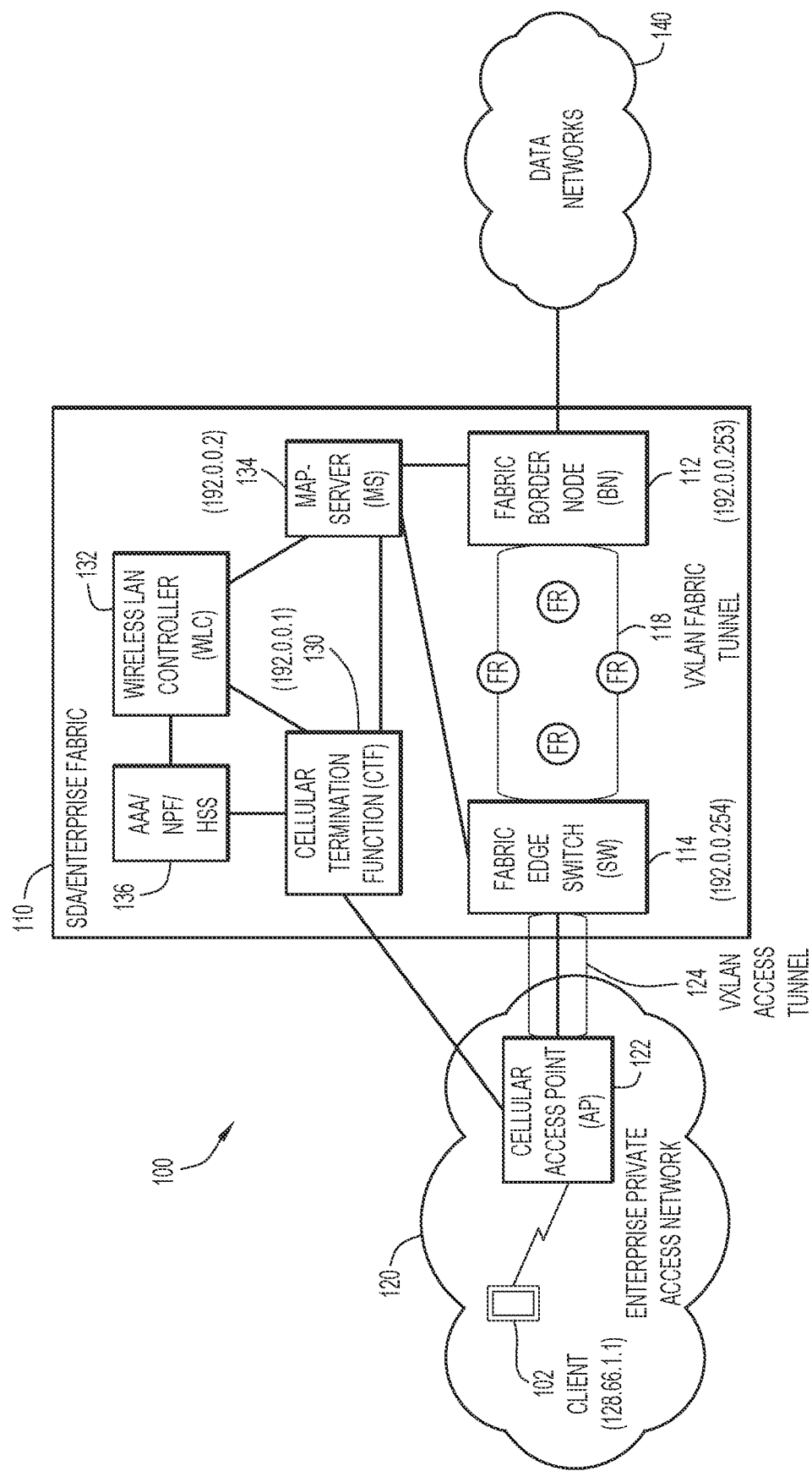
FIG. 1A is a block diagram of an example system in which techniques that provide for extending a cellular Quality of Service (QoS) bearer through an enterprise fabric may be implemented, according to an example embodiment.
Figure 1B:
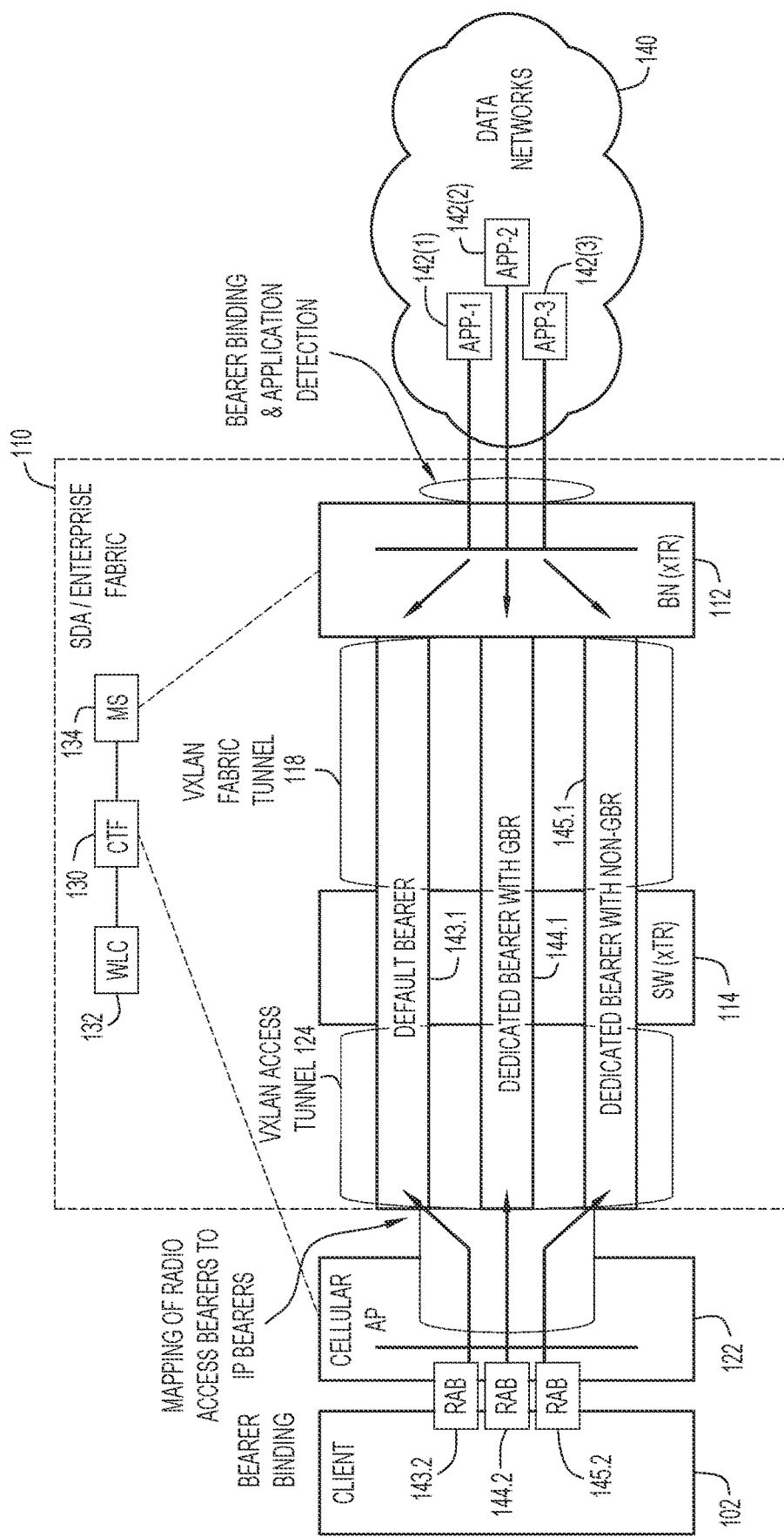
FIG. 1B is a block diagram illustrating other details of the system of FIG. 1A, according to an example embodiment.

Referring to FIG. 1A, FIG. 1A is a block diagram of an example system 100 in which techniques that provide for extending cellular Quality of Service (QoS) into an enterprise fabric 110 may be implemented, according to an example embodiment. FIG. 1B is another block diagram illustrating other example details associated with system 100 of FIG. 1A, according to an example embodiment. Reference may be made to example details illustrated in FIGS. 1A and 1B in discussing various features of system 100.

In at least one implementation, system 100 may include enterprise fabric 110, an enterprise private access network 120, including one or more cellular access point(s) (AP(s)), such as a cellular AP 122, and one or more data network(s) 140. Also shown in FIGS. 1A-1B is a client 102. As referred to herein, a 'client' may also be referred to a user equipment (UE), user, device, user/device, or the like.

Enterprise fabric 110 may include one or more fabric border switch(es) (also referred to herein as border node(s)) such as a border node (BN) 112, one or more fabric edge switch(es), such as a fabric edge switch (SW) 114, one or more fabric routers (FR), such as a fabric router (FR) 116, a cellular termination function (CTF) 130, a wireless local area network (LAN) controller (WLC) 132, a Map-Server (MS) 134, and any combination of: a authentication, authorization, and accounting function (AAA), a network policy function (NPF), and/or a 3rd Generation Partnership Project (3GPP) Home Subscriber Server (HSS) 136 (referred to herein as AAA/NPF/HSS 136). A fabric edge switch may also be referred to herein as an access switch.

Although various interconnections/interfaces among various elements of enterprise fabric 110 are illustrated in FIG. 1A (e.g., among CTF 130, WLC 132, Map-Server 134, AAA/NPF/HSS 136, SW 114, BN 112, etc.) it is to be understood that any elements of enterprise fabric 110 may be interconnected and/or interface using any wired and/or wireless connections to facilitate communications, operations, etc. among the elements as discussed for techniques described herein. CTF 130 and SW 114 may further interface with cellular AP 122. BN 112 may further interface with one or more data network(s) 140. In various embodiments, data network(s) 140 may be any combination of a wide area network (WAN), the Internet, an Internet Protocol (IP) Multimedia Subsystem (IMS), an Ethernet network, Ethernet switching system(s), an enterprise network, an enterprise data center, and/or the like.

Enterprise fabric 110 may employ a software-defined access (SDA) and may represent a programmable network that provides software-based policy and segmentation from an edge of the enterprise fabric to applications/devices/nodes/etc. external to the enterprise fabric that utilizes the enterprise fabric for end-to-end connectivity. As referred to herein, the terms 'enterprise fabric', 'enterprise IP fabric', 'enterprise network fabric,' 'SDA/enterprise fabric,' and variations thereof may be used interchangeably to refer to an enterprise fabric, such as enterprise fabric 110, which may employ SDA to facilitate end-to-end network connectivity for multiple accesses via the enterprise fabric. Thus, enterprise fabric 110 may also be referred to herein as SDA/enterprise fabric 110.

Enterprise fabric 110 may be access-agnostic and may provide end-to-end connectivity for any access type and/or combination of access types (e.g., wired, cellular, Wi-Fi®, etc.) that may be implemented via enterprise private access network 120. Thus, although only a cellular AP 122 is illustrated for enterprise private access network 120, it is to be understood that SW 114 may provide connectivity to multiple types of access points (e.g., any combination of cellular, Wi-Fi, etc. APs), combined access points (e.g., combined cellular/Wi-Fi access points), and/or the like. For some discussions herein involving cellular QoS features, enterprise private access network 120 may be referred to interchangeably as enterprise private cellular access network 120; though it is to be understood that the network may facilitate any type of access in accordance with various embodiments.

An enterprise fabric may span different geographic enterprise locations (or sites), such as a main campus, remote branches, and so on, each with multiple devices, services, and/or policies in order to serve enterprise purposes (e.g., business purpose, government purpose, educational/university purpose, etc.) of an enterprise entity. Accordingly, an enterprise fabric, such as enterprise fabric 110 and/or any other enterprise fabric discussed herein provides an end-to-end architecture that ensures consistency in terms of connectivity, segmentation, and policy across the different locations of an enterprise.

For enterprise fabric 110, BN 112, SW 114, and FR 116 may be considered Layer 2 (L2)/Layer 3 (L3) switches/routers for the enterprise fabric. An edge switch, such as SW 114, may be provided on an edge of the enterprise fabric 110 to provide connectivity to one or more access points, such as cellular AP 122. A border switch, such as BN 112, facilitates connectivity of a fabric domain, such as enterprise fabric 110 to external networks, such as wide area networks (WANs), which may be inclusive of data network(s) 140. A border switch may also be referred to interchangeably as a fabric border node and an edge switch may also be referred to interchangeably as a fabric edge node. FR 116 may provide routing/forwarding features for routing/forwarding traffic across enterprise fabric 110. BN 112, SW 114, and/or any other data plane nodes of enterprise fabric (e.g., FR 116)) may operate as points of policy enforcement for enterprise fabric 110. That is, BN 112 and SW 114 may enforce enterprise fabric policy on traffic flowing through the enterprise fabric between one or more client(s) and one or more external network(s), element(s), application(s), etc.

As referred to herein, the term 'cellular' may refer to any combination of 3rd Generation Partnership Project (3GPP) licensed accesses (e.g., 3rd Generation (3G), 4th Generation (4G)/Long Term Evolution (LTE), 5th Generation (5G), and/or next Generation (nG) accesses), Citizens Broadband Radio Service (CBRS) accesses, private 3GPP/CBRS accesses (e.g., private 4G/LTE, private 5G, etc.), and/or the like now known or hereafter developed.

By 'private' it is meant that a private cellular access network provides network connectivity/services to clients (e.g., users/devices/etc.) served by a network operator and/or service provider of the private cellular access network, such as an enterprise. In one example, a private cellular access network may be considered to be a network that may be implemented to serve enterprise purposes (e.g., business purposes, government purposes, educational purposes, etc.) for enterprise clients (e.g., enterprise users/devices/etc.) in which the private cellular access network may be operated by any combination of traditional mobile network operators/service providers (e.g., AT&T®, Verizon®, etc.), enterprises network operators/service providers (e.g., Cisco®, etc.), and/or third party network operators/service providers (e.g., neutral host network operators/service providers, cloud service providers, etc.). Cisco is a registered trademark of Cisco Technology, Inc.

In general, cellular AP 122 may terminate a cellular air interface and may be configured with appropriate hardware (e.g., processor(s), memory element(s), antennas and/or antenna arrays, baseband processors (modems), and/or the like), software, logic, and/or the like to provide over-the-air coverage for an enterprise private cellular access network (e.g., private 4G/LTE, private 5G, private CBRS, etc.).

In various embodiments, cellular AP 122 may be implemented as any combination of an evolved Node B (eNB or eNodeB) to facilitate 4G/LTE air accesses, a next generation Node B (gNB or gNodeB) to facilitate 5G air accesses, a next generation (nG) radio to facilitate any next Generation air accesses, a CBRS device (CBSD) to facilitate CBRS accesses, and/or the like now known here or hereafter developed.

Client 102 may be configured with appropriate hardware (e.g., processor(s), memory element(s), antennas and/or antenna arrays, baseband processors (modems), and/or the like), software, logic, and/or the like to facilitate an over-the-air (air) interface for accessing/connecting to an access point of enterprise private access network, such as cellular AP 122. Client 102 may be referred to interchangeably herein as 'user/device 102', 'UE 102', and variations thereof.

In various embodiments, client 102 may be associated with any electronic device, machine, robot, etc. wishing to initiate a flow in system 100. The terms 'user equipment', 'subscriber', 'mobile device', 'device', 'electronic device', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smartphone, a tablet, an IP phone, any other device and/or combination of devices, component, element, and/or object capable of initiating voice, audio, video, media, or data exchanges within system 100. Clients discussed herein may also be inclusive of a suitable interface to a human user such as a microphone, a display, a keyboard, or other terminal equipment. Clients discussed herein may also be any device that seeks to initiate a communication on behalf of another entity or element such as a program, a database, or any other component, device, element, or object capable of initiating an exchange within system 100. It is to be understood that any number of clients 102 may be present in system 100.

As referred to herein, the term 'downlink' (DL) may refer to communications (e.g., packets, signaling, etc.) directed to a client from a network and the term 'uplink' (UL) may refer to communications directed to a network from a client.

For techniques provided herein, CTF 130 may provide/be responsible for any combination of cellular-based access authentication services, authorization services, mobility management control, session management services with various functions being supported on a per-session basis, and/or the like. CTF 130 may terminate the S1-MME interface from cellular AP 122 for 4G/LTE and/or the N1/N2 interfaces for 5G. In various embodiments, CTF 130 may be configured with functionality that may inherit functionality in whole or in part as may typically be associated with any combination of a 4G/LTE Mobility Management Entity (MME), a Serving Gateway (SGW), and/or a Packet Data Network (PDN) Gateway (PGW); a 5G Access and Mobility Management Function (AMF) and/or Session Management Function (SMF); and/or the like now known here or hereafter developed.

WLC 132 may provide/be responsible for wireless LAN (WLAN) functions such as, WLAN-based access authentication services, authorization services, intrusion prevention, RF management, and/or the like to facilitate client connectivity via a WLAN AP (e.g., a Wi-Fi AP, not shown). In some implementations, WLC 132 may be configured as an evolved WLC (eWLC). Although illustrated as separate entities for the embodiment of FIG. 1, in at least one embodiment, CTF 130 and WLC 132 may be configured as a combined or converged multi-access termination function (MATF) that may be configured to provide operations, functions, etc. as discussed for embodiments herein for multiple accesses with which enterprise fabric 110 may interface.

Further for techniques provided herein, AAA/NPF/HSS 136 may provide/be responsible for any combination of: providing authentication, authorization, and accounting functions for clients (e.g., client 102) that may be present in system 100; managing subscription/policy information for one or more clients that may be present in system 100 (e.g., access profile information, as discussed below, among other subscription/policy information); maintaining per-client session information for various accesses to which each client is connected; combinations thereof; and/or the like. In various embodiments, AAA/NPF/HSS 136 may be implemented as any combination of standalone and/or combined elements (e.g., separate AAA, NPF, and HSS elements; a combined AAA/HSS element without an NPF element; an AAA element and an NPF element without an HSS element; etc.) in order to facilitate authentication, authorization, and accounting operations (referred to herein as 'AAA-based' operations) as well as policy-based operations for enterprise fabric 110.

Generally, authentication refers to the process where an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity, typically inherited from authentication when logging on to an application or service. In various instances, authorization may be determined based on a range of restrictions, for example time-of-day restrictions, or physical location restrictions, or restrictions against multiple accesses by the same entity or user/device. Generally, accounting refers to the tracking of network resource consumption by users/devices for the purpose of capacity and trend analysis, cost allocation, billing, etc.

In various embodiments, AAA/NPF/HSS 136 may be configured with or obtain (e.g., from an external database/service/etc.) per-client access profile information that may include, but not be limited to, client (e.g., user/device) identity information, authentication type attributes (e.g., authentication type, sub-type, etc.), authentication attributes (e.g., credentials, passwords, keys, etc.), combinations thereof, and/or the like. Additionally, AAA/NPF/HSS 136 may be configured with or obtain (e.g., from an external database/service/etc.) per-client subscription/policy information that may include, but not be limited to, service quality information such as Quality of Service (QoS) information, QoS Class Identifier (QCI), Guaranteed Bit Rate (GBR), Maximum Bit Rate (MBR), Aggregate Maximum Bit Rate (AMBR), Allocation and Retention Priority (ARP), packet delay information, packet loss information, combinations thereof, and/or the like for one or more client sessions. In various embodiments, subscription/policy information may also include 3GPP service name information such as Access Point Name (APN) for 4G/LTE networks or Data Network Name (DNN) for 5G networks, combinations thereof, and/or the like for one or more client sessions, which may include one or more QoS Flow Templates (QFT), as discussed in further detail herein.

In various embodiments, AAA/NPF/HSS 136 may be configured with one or more databases/repositories/etc. and/or may interface with one or more external databases/repositories/etc. in order to obtain and/or be configured with access profile information, subscription/policy information, etc. for clients. Such internal/external databases/repositories/etc. may include any combination of enterprise databases, repositories, and/or the like for one or more clients that may be allowed to connect to accesses with which enterprise fabric 110 may interface. In various embodiments, AAA/NPF/HSS 136 may be implemented as any combination of a Cisco® Digital Network Architecture Center (DNAC or DNA-C) Access Control Application (ACA), a Cisco® Identity Services Engine (ISE), an AAA, an enterprise policy server/manager, a 3GPP HSS, combinations thereof, and/or the like.

AAA/NPF/HSS 136 may be capable of interfacing/communicating with other elements of system 100 (e.g., CTF 130 and WLC 132) via any combination of Remote Authentication Dial-In User Service (RADIUS) protocol mechanisms (e.g., messaging, signaling, etc.), DIAMETER protocol 3GPP S6a interface mechanisms, S6a-based interface mechanisms (e.g., for architectures that may involve interfaces based on, but not strictly adhering, to 3GPP defined S6a interface mechanisms), Application Programming Interface (API) mechanisms (e.g., for messaging, signaling, etc. that may be defined by an enterprise, 3rd-party, application, etc.), fabric-defined interfaces (e.g., as may be defined by an enterprise), combinations thereof, and/or the like.

Enterprise fabric 110 may include an overlay network, such as a Virtual Extensible Local Area Network (VXLAN or VxLAN) overlay network, built on top of an underlay network. The VXLAN overlay network may facilitate tunneling for the user plane (also referred to interchangeably as data plane or user data plane) of enterprise fabric 110. Although embodiments herein provide example details associated with VXLAN, other tunneling protocols may be implemented for enterprise fabric 110 including, but not limited to, Generic Routing Encapsulation (GRE) (as may be prescribed at least by Internet Engineering Task Force (IETF) Request For Comments (RFC) 1701 and 2784), IP-in-IP (as may be prescribed at least by RFC 2003), IP-in-UDP, among others.

In at least one embodiment, a tunneling protocol, such as VXLAN, may be implemented using Locator/ID Separation Protocol (LISP) to facilitate IP mobility for the enterprise fabric 110, as discussed in further detail herein. Generally, LISP is a control plane protocol that provides for managing the mobility for an endpoint (e.g., client 102). The LISP control plane can be used between forwarding plane elements (e.g., SW 114 and BN 112) and the Map-Server 134 for managing the mobility state related to a client. Although embodiments herein provide example details associated with a LISP implementation, other control plane protocols may be implemented for enterprise fabric 110 including, but not limited to, Proxy Mobile IPv6 (as may be prescribed at least by RFC 5213 and 5844), Identifier Locator Addressing (ILA), among others.

A LISP implementation, as prescribed at least by Internet Engineering Task Force (IETF) RFC 6830, RFC 6833, etc. may utilize various constructs including Routing Locators (RLOCs) that may be associated with edge and border switches (e.g., SW 114 and BN 112) and endpoint identifiers (EIDs) that may be associated with/identify clients or other endpoints (e.g., APs, etc.) in order to facilitate mobility for enterprise fabric 110. An RLOC is an IP address associated with an element in which the nomenclature 'RLOC=element' may generally represent an RLOC set to the IP address of the element. Other variations for setting an RLOC can be envisioned using, for example, Type-Length-Value (TLV) expressions, or the like. IP addresses as discussed for embodiments described herein may be implemented as IP version 4 (IPv4) and/or IP version 6 (IPv6) addresses.

Per a LISP architecture implementation, edge and border switches may be considered ingress/egress tunnel routers (TRs) that may provide ingress and egress tunnel routing operations to facilitate network communications, such as data plane communications for enterprise fabric 110, and may be referred to as 'xTRs' (e.g., ingress/egress TRs) or proxy 'xTRs' (PxTRs) configured to provide xTR functionality (e.g., ingress/egress routing functionality). In one instance, a VXLAN tunnel, such as VXLAN fabric tunnel 118 between fabric edge switch 114 and fabric border node 112 may be implemented using LISP to provide data plane network connectivity for client 102 across enterprise fabric 110 (e.g., for forwarding traffic flows for the client across enterprise fabric 110). Additionally, a VXLAN access tunnel 124 may be implemented between SW 114 and cellular AP 122 to facilitate data connectivity for client 102 with enterprise fabric 110.

Map-Server (MS) 134 is a LISP function that represents a distributed mapping database and service that accepts registration information for clients (e.g., client 102) and/or other endpoint users/devices, etc. (e.g., cellular AP 122), and stores mappings between numbering or name space (referred to herein, generally, as 'space') constructs used by the VXLAN overlay of enterprise fabric 110. The mappings define VXLAN tunnels for traffic flows across and in-and-out of enterprise fabric 110 such as VXLAN fabric tunnel 118 and VXLAN access tunnel 124. For the LISP implementation of enterprise fabric 110, Map-Server 134 stores mappings, generally known as EID-to-RLOC mappings, between RLOCs for fabric switches/functions/etc. (e.g., SW 114) and EIDs for clients (e.g., client 102) for which traffic is handled or otherwise associated with the switches/functions/etc. EIDs can be associated with any combination of IP and/or MAC addresses for a client for different EID-to-RLOC mappings that may be maintained/managed within enterprise fabric 110. EID-to-RLOC mapping information can be communicated to various elements of enterprise fabric 110 (e.g., SW 114, BN 112, CTF 130, etc.) and stored in the map-cache of the elements to facilitate routing via enterprise fabric 110.

While Map-Server 134 provides a central control point for facilitating mobility across enterprise fabric 110, CTF 130 represents an access control point that integrates operationally with the Map-Server 134. To this end, in one embodiment, CTF 130 may communicate with AAA/NPF/HSS 136, WLC 132, Map-Server 134, and cellular AP 122 using any combination of protocols such as RADIUS, DIAMETER, fabric-based protocols, API-based protocols, etc. CTF 130 can also communicate with client 102 via cellular AP 122; for example, logically, Non-Access Stratum (NAS) messages can be exchanged between client 102 and CTF 130, but these messages are transported over the Access Stratum (AS) via the air interface between the client and the cellular AP.

In some instances, private cellular deployments may be based on the same back-end service core as is provided for traditional 3GPP deployments. For example, a subscriber's access to IP services is through a 3GPP-defined evolved packet core (EPC) architecture. However, based on analysis of the EPC interfaces, functions, and features, it is believed that a large portion of the packet core functionality of the 3GPP core network may not applicable to enterprise/IoT architectures. Most of the features for facilitating access to IP services is already provided in enterprise IP architectures for serving WLAN (e.g., Wi-Fi®) and wired (e.g., Ethernet) clients/users. A 3GPP core such as the EPC is a system that is designed for service-oriented architecture and it carries many legacy features that may have no relevance in an enterprise context.

One of the key aspects of any licensed radio is the QoS support that private cellular brings to enterprise architectures. More specifically, there is the concept of Evolved Packet System (EPS) bearers that private cellular access inherits from the EPS architecture. Each EPS bearer represents a particular QoS classification and treatment on an IP/application flow basis. The parameters that define the EPS bearer include QCI/Differentiated Services Code Point (DSCP), Guaranteed Bit Rate (GBR), Maximum Bit Rate (MBR), etc. (e.g., as may be defined per RFC 7222, 3GPP Technical Specification (TS) 29.212, etc.), most of which can be mapped to QoS elements that may be provided in enterprise IP architectures.

In a 3GPP core network architecture, these bearers start at the PGW and/or user plane function (UPF) and extend all the way to the client/UE such that they are mapped to radio access bearers (RAB s), also referred to herein as radio bearers (RB s), in the cellular AP. The radio bearers are premium resources that are to be kept active only when there is an active flow and are initiated by control plane functions in the network/UE. For example, providing a GBR bearer, as the name implies, guarantees that a specific minimum bit rate is always available on that bearer. This assurance implies resource-locking and admission-control are to be in place at the cellular AP and on the network nodes. This also implies that a mechanism is needed in the enterprise fabric data plane to create and delete these bearers (radio+core network bearers) on a need-based basis and in a dynamic manner when there is detection of application traffic in the enterprise fabric data plane that may involve certain QoS treatment.

Presented herein are interworking techniques that are provided between elements of the enterprise fabric 110 that facilitate fabric connectivity (e.g., Map-Server 134, BN 112, SW 114, etc.) and private cellular access-specific control plane elements (e.g., CTF 130, AAA/NPF/HSS 136, etc.) that facilitate the creation, termination, and/or management of radio and core network bearers.

Techniques herein provide for defining and implementing an approach in which 3GPP core functions such as the MME+PGW-C+SGW-C (for 4G/LTE architectures) and/or the AMF+SMF (for 5G architectures) can be collapsed and shrunk into a function, such as the CTF 130. By leveraging the services that are provided by functions of enterprise fabric 110 (e.g., MS, AAA, NPF, etc.), CTF 130 can provide most of the functions that a typical EPC offers to a client (e.g., authentication, IP address management, IP mobility, QoS, etc.) to successfully enable private cellular access in the enterprise fabric 110 architecture. For example, the elements of the enterprise 110 architecture include LISP functions/functionality, which can be leveraged to provide IP mobility support without the use of an IP mobility anchor such as a 3GPP UPF/PGW that are typically implemented in 3GPP core networks architectures.

Thus, techniques herein provide dynamic QoS support to a client (e.g., client 102) connected to enterprise cellular network 120 in enterprise fabric 110 in which the enterprise fabric can be implemented with no 3GPP UPF/SGW-U/PGW-U elements deployed within the fabric while still providing for the ability to provide/enforce end-to-end QoS handling of client data flows within the fabric. In at least one embodiment, these techniques may provide interworking between enterprise fabric 110 data/control plane elements and cellular control plane functions for the creation/deletion of radio and core network QoS bearer by extending the manner in which the LISP control plane is utilized in enterprise fabric 110. With these extensions, a QoS bearer, which can be characterized as a certain QoS classification, can extend from a client (e.g., client 102) to the SDA/enterprise fabric 110 domain border (e.g., BN 112) thereby facilitating end-to-end QoS and bringing a unique value to the SDA/enterprise fabric 110 architecture.

Although discussions herein illustrate details for cellular accesses such as LTE access, it is to be understood that the identified extensions can be used with other access specific QoS mechanisms, such as with Wi-Fi Multimedia Admission Control (WMM-AC) in Wi-Fi. Additionally, although implementation details provided herein may focus on a LISP control plane implementation for SDA/enterprise fabric 110, it is to be understood that techniques presented herein may be equally applicable to non-LISP control plane implementations in order to facilitate extending QoS bearers into an enterprise fabric.

Broadly, operations involving extending QoS bearers into enterprise fabric 110 may include, for each supported APN, defining (e.g., by a network administrator, etc.) one or more QoS Flow Templates (QFTs) that may be configured on the CTF 130 or that may be recovered/obtained by the CTF 130 (e.g., via AAA/NPF/HSS 136). Each QFT may identify QoS information, such as policies and/or attributes (e.g., QCI, QoS policies such as AMBR (UL/DL), GBR (UL/DL), rate limiting, etc. as may be defined per RFC 7222, 3GPP TS 29.212, etc.)

Each QFT may also include a Traffic Selector (TS) that may be used to identify client traffic (e.g., packets) based on one or more indicators such as a certain IP flow, a certain application flow, traffic to a certain IP destination address, certain DSCP markings and/or QCI markings included with the packet, etc. for which a QoS treatment is to be applied. In various embodiments, QFTs may be defined on a QoS-based basis for certain types of application(s), for all/certain application(s) for a given user/client (e.g., based on subscription), for group(s) of users/clients and/or for certain application(s), combinations thereof, and/or the like.

Each QFT may be associated with an index value, referred to herein as a QoS Flow Index (QFI) value, which can be used to identify the corresponding QFT by various elements within enterprise fabric 110. Nodes within the fabric can use to QFI to identify a corresponding QFT. Consider an example involving a downlink packet received by BN 112. When a downlink packet for a client enters the fabric (e.g., transmitted to client 102 from an application), the BN 112 can classify the traffic to a bearer using various Traffic Flow Templates (TFTs) (e.g., as prescribed by 3GPP TS 29.274 and TS 24.008) and can identify the QFT associated with that traffic (application) based on indicators provided for the Traffic Selector+the IP address for the client (EID) for the associated QFT. The packet can be encapsulated using a tunnel encapsulation in which an outer header of the encapsulation can be marked with a bearer 'hint', such as QFI, a General Packet Radio Service (GPRS) Tunneling Protocol (GTP) Tunnel Endpoint Identifier (TEID), or the like, as discussed in further detail below. The DSCP/QCI associated with the QFT may also be encoded in an outer IP header of the tunnel encapsulation, as discussed in further detail herein, which can be used by the fabric nodes to provide a level of QoS handling for the packet in accordance with the matched QFT. The BN 112 can forward the encapsulated packet to SW 114 via the VXLAN fabric tunnel 118. In addition to encapsulating and forwarding the packet, BN 112 can also enforce any QoS policies for the matched QFT (e.g., rate limiting, etc.).

Upon receiving the encapsulated packet, the edge switch SW 114 can relay the QFI and the DSCP/QCI from the VXLAN fabric tunnel 118 to the VXLAN access tunnel 124 via another tunnel encapsulation for the packet. Upon receiving the packet, cellular AP 122 can identify the radio QoS policy/policies for the flow as well as the radio access bearer for the client using the bearer 'hint (e.g., QFI, TED, etc.) and DSCP/QCI markings as well as other fields in the packet (e.g., destination/client IP address, etc.), as discussed in further detail herein. The cellular AP can transmit the packet to the client using the identified radio access bearer. In various embodiments, a Traffic Selector may be configured for a QFT using any information, parameters, etc. that may provide for identifying an application, service, and/or the like that may trigger QoS treatment (e.g., via a default or dedicated QoS bearer) for a client's traffic for enterprise fabric 110. For example purposes only, applications, services, etc. can include, but not be limited to, Session Initiation Protocol (SIP)/Real-time Transport Protocol (RTP) applications such as Voice over Internet Protocol (VoIP), video conferencing applications such as Cisco® WebEx®, gaming applications, streaming audio/video applications, third-party applications, etc. In various embodiments, a Traffic Selector configuration may include IP address information, port information, application identifying information (e.g., application identifier, application instance identifier, etc.), wildcard information (e.g., for identifying any/all default bearer traffic for a client), DSCP/QCI markings, combinations thereof, and/or the like that may facilitate identifying client traffic for QoS treatment. In some instances, as discussed in further detail herein, detection of a QFT associated with a dedicated may result in a dedicated QoS bearer when the user plane detects client traffic matching a Traffic Selector (TS) for a dedicated bearer that has not yet been established for a client or when there is a request from an application function (such as WebEx®) via an application server, such as the Cisco® DNAC.

Consider an example involving client 102 in which three QFTs may be configured in CTF 130 for client 102, as shown in Table 1, below. For the present example, consider that client 102 is allocated an IP address of '128.66.1.1' upon successful attachment to enterprise fabric 110 via cellular AP 122. Further consider that BN 112 is configured with an IP address of '192.0.0.253', that fabric edge switch (SW) 114 is configured with an IP address of '192.0.0.253', that CTF 130 is configured with an IP address of '192.0.0.1', and that Map-Server 134 is configured with an IP address of '192.0.0.2'.

Unlike the default LISP mapping system's behavior of IP-to-IP mapping, embodiments herein provide that the TS and QoS will be additional elements in EID-to-RLOC binding, in the form EID {IP, TS}->RLOC {IP, QoS}. In other words, the EID can be split into multiple micro EIDs, each that can be identified by a Traffic Selector+overlay IP address. In Table 1, above, there are RLOC entries for the same overlay IP address (for client 102), each with a different Traffic Selector.

Thus, the mapping system for enterprise fabric 110 is extended to include Traffic Selector information for disambiguation in RLOC selection, where the EID-to-RLOC mapping includes an association to a Traffic Selector. There can be multiple RLOCs for the same overlay IP address (e.g., client 102) but each RLOC may be mapped on an overlay IP+TS basis.

After the successful attach of client 102 enterprise fabric 110 and to a specific APN (e.g., APN=enterprise.com), the Map-Server 134 in the enterprise fabric 110 network will have an entry for the client 102 with an EID-to-RLOC mapping for the client. The CTF 130 will also update the mapping with the QFTs associated with the APN and/or authorized for the particular client 102 session.

In one embodiment, one or more Publication communications may be sent from Map-Server 134 to BN (xTR) 112 or the like within the enterprise fabric 110 domain to provide the QFTs and RLOC mapping information for client 102.

The BN 112 can install forwarding rules for the EID (IP+TS) based on the QFTs. All traffic by default (e.g., for default bearer of a client) will have a VXLAN overlay route towards the RLOC of the edge switch SW 114 to which the client 102 (or the cellular AP 122) is currently attached.

BN 112 performs bearer binding and application detection for client 102 traffic (e.g., downlink packets) that may be received from one or more data network(s) 140 via one or more applications 142, such as a first application (App-1) 142(1), a second application (App-2) 142(2), and a third application (App-3) 142(3), as shown in FIG. 1B.

On receiving a downlink packet for the EID (client 102), BN 112 will match the QFT associated with that flow based on determining a TS rule match for the flow in order to bind the packet to an IP bearer (e.g., a QoS classification such as can be represented by QFI) facilitated via VXLAN fabric

TABLE 1

| EID | | RLOC | |
| --- | --- | --- | --- |
| Overlay IP | Traffic Selector | Underlay IP | QoS |
| 128.66.1.1 | ALL | 192.0.0.254 (RLOC of edge switch to which client is connected) | QFT: 1/QFI1 Default Bearer {QCI: 9} |
| 128.66.1.2 | Application = SIP/RTP | 192.0.0.1 or 192.0.0.253 (RLOC of CTF or BN for bearer creation trigger (other ALTs)) | QFT: 2/QFI2 Dedicated Bearer {QCI: 1, GBR (UL/DL): 128 KBPS), MBR (UL/DL): 1 Mbps} |
| 128.66.1.3 | Application = Video Conference | 192.0.0.1 or 192.0.0.253 (RLOC of CTF or BN for bearer creation trigger (other ALTs)) | QFT: 3/QFI3 Dedicated Bearer {QCI: 7} |

Each QFT may be characterized by a 3-tuple: [QFI, QCI, TS]. For the present example, consider that QFT: 1 may be characterized as 'QFT1=[QFI1, QCI=9, TS(ALL)]'; QFT: 2 may be characterized as 'QFT2=[QFI2, QCI=1, TS(SIP/RTP)]; and QFT: 3 may be characterized as 'QFT3=[QFI3, QCI=7, TS(Video Conference)].

tunnel 118 provided by enterprise fabric 110. For example, an IP bearer binding may be provided for a default bearer 143.1 facilitated via VXLAN fabric tunnel 118, as shown in FIG. 1B. In another example, bindings may also be provided for a dedicated bearer with GBR 144.1 and a dedicated bearer for non-GBR 145.1. Each corresponding IP bearer provided via enterprise fabric 110 VXLAN fabric tunnel 118 may be associated with a corresponding radio access bearer (RAB or RB) provided via cellular AP 122 in which a corresponding QoS bearer may be characterized as an end-to-end (fabric border to client) bearer that encompasses the IP bearer and associated radio access bearer. For example, a default radio access bearer 143.2 may be associated with the default bearer 143.1, a dedicated radio access bearer 144.2 may be associated with the GBR dedicated bearer 144.1, and a dedicated radio access bearer 145.2 nay be associated with the non-GBR dedicated bearer 145.1.

The BN 112 can set a DSCP in an (outer) IP header of a VXLAN tunnel encapsulation for the downlink packet to the DSCP value associated with that QFT or, more specifically, the QCI associated with that QFT. The DSCP/QCI value set in the IP header of the VXLAN tunnel encapsulation can be used by the routers/switches (e.g., BN 112, SW 114, FRs 116, etc.) of the enterprise fabric 110 to provide a level of service for the packet that meets the QoS classification for the downlink packet as it is forwarded/handled across enterprise fabric 110.

In accordance with techniques discussed herein, a bearer 'hint' or bearer indicator may be included in an outer VXLAN header for downlink packets to enable the cellular AP to identify an appropriate radio bearer upon which to transmit downlink data to client 102. The bearer indicator can be used by the cellular AP 122, in combination with an IP address of the client 102, to identify a radio bearer for transmitting the downlink packet to the client 102. In various embodiments, a bearer indicator may be a QFI for a corresponding matched QFT, a GPRS TEID generated for a given radio bearer (default or dedicated) created/established for client 102, and/or the like.

Thus, the BN 112 can provide for setting-up overlay forwarding route to the RLOC for an associated flow, based on the traffic selector; thereby enforcing the QoS policies per QFT. For example, the overlay route for default traffic for client 102 received by BN 112 can be routed towards SW 114 (RLOC=192.0.0.254) via VXLAN fabric tunnel 118.

SW 114, upon receiving the downlink packet, can copy the bearer indicator (e.g. QFI, TEID, etc.), remove the VXLAN tunnel encapsulation (also referred to as de-capsulation or 'decap') for the VXLAN fabric tunnel 118, identify the VXLAN access tunnel through which to forward the downlink packet to the cellular AP 122 connected to SW 114 (e.g., VXLAN access tunnel 124), provide another VXLAN tunnel encapsulation for the downlink packet that includes the copied bearer indicator in the VXLAN header and some of the information in the outer IP header (e.g., DSCP/QCI marking), and can forward the downlink via the VXLAN access tunnel 124 to cellular AP 122.

The cellular AP 122 may maintain a mapping of radio bearers to IP bearers for client 102 based on the QFTs and IP address of the client 102 (e.g., client IP+bearer indicator (X)<-->radio access bearer ID (RABID or RAB ID) (X) for a given 'X' identifier, etc.). The cellular AP 122 may also maintain vMAC to TEID mappings. Upon receiving the VXLAN encapsulated packet including the downlink packet for client 102, the cellular AP 122 can identify the radio access bearer corresponding to the IP bearer for the client 102 based on the bearer indicator (e.g., QFI) included in the VXLAN header of the encapsulated downlink packet and the IP address of the client 102 included in the downlink packet. The cellular AP 122 can transmit the downlink packet to the client using the identified radio access bearer.

Different alternatives may be utilized to facilitate bearer creation for dedicated bearers via enterprise fabric 110. For example, in one embodiment, the RLOC for a dedicated bearer QFT (e.g., QFT2 or QFT3) for client 102 can be set to the RLOC of the CTF 130 (e.g., RLOC=192.0.0.1). In such an embodiment, upon receiving and matching a downlink packet to a dedicated bearer QFT for an EID-to-RLOC mapping for client 102 that includes RLOC set to the CTF 130, BN 112 can forward the downlink packet to CTF 130 to trigger the radio bearer creation for the client 102 and then update the RLOC, so the subsequent packets in the media stream will go directly to the switch to which the client/AP is attached and with the QoS treatment as defined in the QFT for that TS. The radio bearer to core network IP bearer mapping can be provided at the cellular AP 122 based on the QFI marking that is inserted in the VXLAN header of the VXLAN tunnel encapsulation provided for the downlink packet at the BN 112.

In some embodiments, the CTF 130 can be configured to buffer the downlink packet and may forward to the downlink packet to the switch to which the client/AP is attached once the radio bearer is created for subsequent forwarding to the AP and transmission to the client.

In another embodiment, the RLOC for a dedicated bearer QFT (e.g., QFT2 or QFT3) for client 102 can be set to the RLOC of the BN 112 (e.g., RLOC=192.0.0.253). In such an embodiment, receiving and matching a downlink packet to a dedicated bearer QFT for an EID-to-RLOC mapping for client 102 that includes the RLOC set to the BN 112 (itself), can trigger BN 112 to generate a control plane notification (e.g., via HyperText Transfer Protocol (HTTP), or the like) for CTF 130 that triggers radio bearer creation for the client 102 by CTF 130 and updating the RLOC for the EID-to-RLOC mapping for the client 102 QFT. In such an embodiment, BN 112 can buffer downlink packets to be delivered to the EID (client 102) until the radio bearer is established and the EID-to-RLOC mapping is updated, upon which the BN 112 can forward the buffered traffic toward the RLOC (e.g., SW 114) in accordance with techniques described herein.

In yet another embodiment, the RLOC for a dedicated bearer QFT (e.g., QFT2 or QFT3) for client 102 can be set to the RLOC of the Map-Server 134 (e.g., RLOC=192.0.0.2) or to the RLOC of the BN 112. In such an embodiment, receiving and matching a downlink packet to a dedicated bearer QFT for an EID-to-RLOC mapping for client 102 that includes the RLOC set to the Map-Server 134 (or the RLOC of the BN 112), can trigger BN 112 to generate a LISP Map Register communication to Map-Server 134 that updates the EID-to-RLOC mapping for the QFT for client 102 to the CTF 130 IP address, which can trigger the Map-Server 134 to notify CTF 130 of the update (e.g., using a Map Notify); thereby triggering CTF 130 for radio bearer creation for client 102. Upon bearer establishment, CTF 130 can update the RLOC for the EID-to-RLOC mapping for the client 102 QFT at the Map-Server 134, which can push the updated mapping to BN 112 via one or more Publication communications or the like. In such an embodiment, BN 112 can buffer downlink packets to be delivered to the EID (client 102) until the radio bearer is established and the EID-to-RLOC mapping is updated, upon which the BN 112 can forward the buffered traffic toward the RLOC (e.g., SW 114) in accordance with techniques described herein. Other variations can be envisioned.

Any time a radio bearer is deleted (e.g., due to an explicit client/network action, upon flow termination, etc.), the RLOC in the cache entries at different xTR nodes can be updated to reflect any of the CTF 130 as the RLOC for the EID (Client IP+TS), BN 112 as the RLOC for the EID (Client IP+TS), or Map-Server 134 as the RLOC for the EID (Client IP+TS), depending on implementation. In other words, when there is no active flow, the RLOC can be reset to an implementation-specific default RLOC and when there is active flow for a given dedicated bearer QFT, bearer creation for the QFT can be triggered and the RLOC for that flow can be updated to the edge switch to which the client/AP is attached. Using this technique, an interface can be built between the enterprise fabric 110 user plane and the cellular control plane for on-demand radio bearer creation/deletion.

Accordingly, techniques herein provide for extending cellular QoS bearer(s) into enterprise fabric 110.

Figure 2:
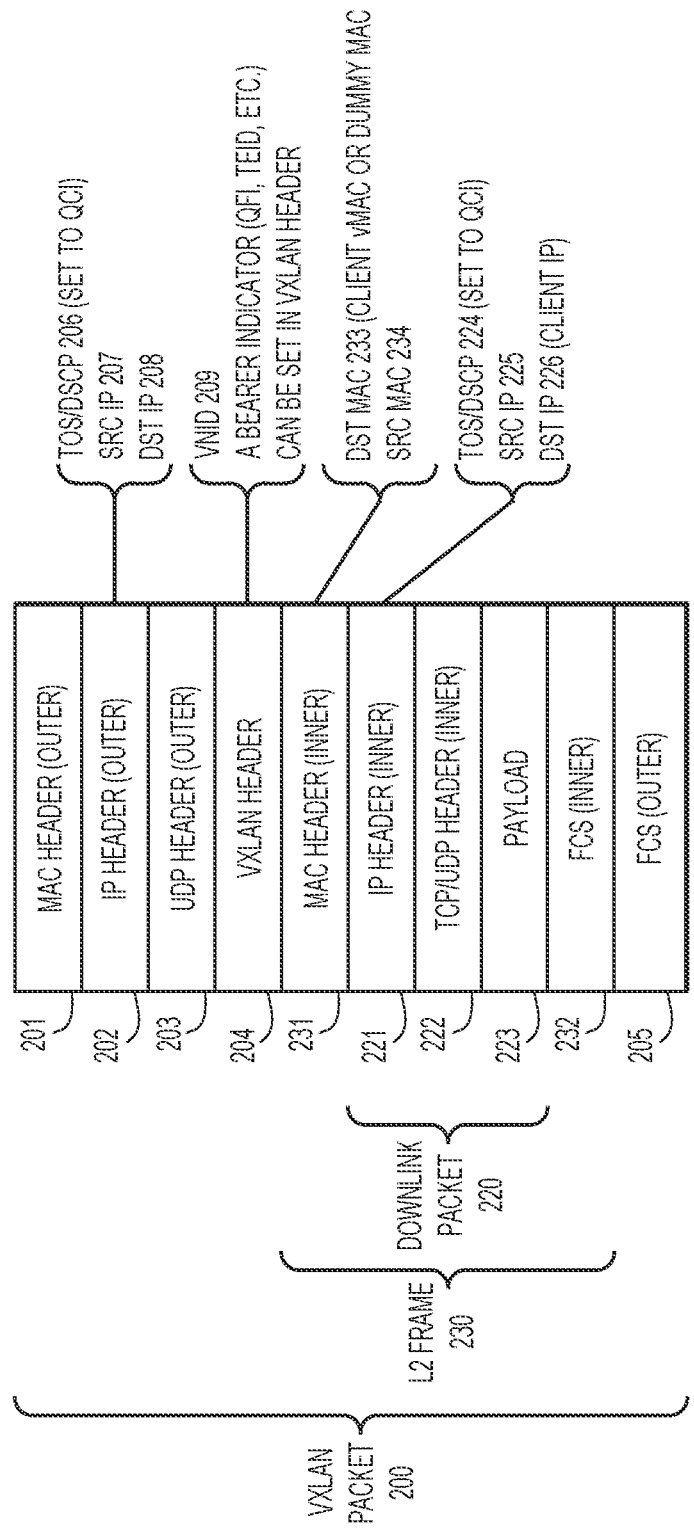
FIG. 2 is a schematic diagram illustrating example details of an example Virtual Extensible Local Area Network (VXLAN) tunnel encapsulation that may be provided for a downlink packet via the system of FIGS. 1A and 1B, according to an example embodiment.

Referring to FIG. 2, FIG. 2 is a schematic diagram illustrating example details of an example Virtual Extensible Local Area Network (VXLAN) tunnel encapsulation that may be provided for a downlink packet via the system 100 of FIGS. 1A and 1B. In particular, FIG. 2 is a schematic diagram illustrating example details associated with a VXLAN tunnel encapsulation of a downlink packet 220, which provides a VXLAN packet 200 (also referred to interchangeably as a VXLAN frame) that can be forwarded within system 100. Although FIG. 2 is discussed with reference to a downlink packet, it is to be understood that similar fields may be for an uplink packet transmitted from a client (e.g., client 102) towards cellular AP 122 connected to enterprise fabric 110 with appropriate fields set to provide for communicating the packet across the enterprise fabric to one or more data network(s) 140.

Features associated with a Layer 2 (L2) frame 230 and a downlink packet 220, discussed below, may be referred to using an 'inner' nomenclature while features associated with the VXLAN packet 200 may be referred to using an 'outer' nomenclature.

Downlink packet 220 may be encapsulated within the L2 frame 230 (e.g., an Ethernet frame) in which downlink packet 220 may include an inner IP header 221, an inner Transmission Control Protocol (TCP) or User Datagram Protocol (UDP) header 222, and a payload 223. The IP header 221 may include various fields including, but not limited to, a Type of Service (TOS)/DSCP field 224, a source (SRC) IP address field 225, and a destination (DST) IP address field 226.

The DST IP address field 226 of a downlink packet, such as downlink packet 220, can include the IP address of a given client, such as client 102, to which the downlink packet is to be delivered. The SRC IP address field 225 can include the IP address of the source of the packet, such as an application within data network(s) 140. In some instances, QCI can be mapped into DSCP carried in one or more bits of a TOS/DSCP field 224 of downlink packet 220. The mapping for different QCI values to TOS/DSCP values can be based on standardized mapping techniques as may be prescribed at least by 3GPP TS 23.203, RFC 7222, and Global System for Mobile Communications Association (GSMA) IR.34 Specification.

L2 frame 230 may include an inner MAC header 231 and an inner Frame Check Sequence (FCS) 232. The inner MAC header 231 may include various fields including, but not limited to, a DST MAC address field 233 and a SRC MAC address field 234. In accordance with techniques herein, the DST MAC address field 233 may, in some embodiments, be set to a virtual MAC (vMAC or VMAC) address for a client to which the downlink packet is to be delivered, such as client 102. In other embodiments, the DST MAC address field 233 may be set to a dummy MAC address. A virtual MAC address is not an actual predetermined (e.g., factory set, etc.) MAC address of a client, but rather an artificial MAC address that may be created to satisfy operational features for forwarding traffic for the client via enterprise fabric 110. For L2 overlay implementations of enterprise fabric, the edge switch SW 114 is such that the client 102 vMAC is reachable via VXLAN access tunnel 124. A dummy MAC, may be characterized a predefined MAC address that is not associated with a client, but rather can be used in a Layer 3 (L3) overlay implementation for enterprise fabric 110. In a L3 overlay implementation the forwarding state at edge switch SW 114 is such that the client 102 EID-IP is reachable via VXLAN access tunnel 124. In such an implementation, when forwarding a downlink packet, BN 112 can set the inner SRC MAC address field 234 to the dummy MAC address.

The VXLAN packet 200 may include an outer MAC header 201, an outer IP header 202, an outer UDP header 203, a VXLAN header 204, and an outer FCS 205. Generally, the outer MAC header 201 may include source and destination MAC addresses to facilitate hop-by-hop forwarding across enterprise fabric 110. The outer IP header 202 may include various fields including, but not limited to, a TOS/DSCP field 206, a SRC IP address field 207, and a DST IP address field 208.

As discussed for techniques herein, a QCI for a corresponding matched QFT (e.g., based on EID (IP+TS) matching) can be set in one or more bits of the TOS/DSCP field 206 of the IP header 202 for the VXLAN packet 200. The SRC IP address field 207 can include the IP address of the source from which the VXLAN packet 200 was encapsulated/transmitted. The DST IP address field 208 can include the IP address of the destination at which the VXLAN packet 200 is to be received. For example, for a downlink packet that is received by BN 112, a VXLAN tunnel encapsulation can be provided for the downlink packet such that a VXLAN packet may include a SRC IP address set to the IP address for BN 112 (e.g., 192.0.0.253) and a DST IP address set to the IP address for SW 114 (e.g., 192.0.0.254).

The VXLAN header 204 may include a VXLAN Network Identifier (VNID) field 209. A bearer 'hint' or bearer indicator may be included in the VXLAN header 204 for downlink packets to enable the cellular AP 122 to identify an appropriate radio bearer upon which to transmit data to client 102. In at least one embodiment, a bearer indicator may be a QFI for a corresponding matched QFT (e.g., based on EID (IP+TS) matching) that may be set within the VXLAN header 204. In another embodiment, a bearer indicator may be a TEID generated for a given radio bearer (default or dedicated) created for client 102.

In some embodiments, a bearer indicator may be set in the VNID field 209 of VXLAN packet 200. The VXLAN header 204 typically includes other fields such as reserved fields and the like in which a bearer indicator may be set, in some embodiments. In other embodiments, a specific bearer indicator field may be defined for the VXLAN header 204 in which a bearer indicator for a corresponding matched QFT can be set for a given downlink packet. For example, if each client in a system may have a maximum of nine (9) bearers, then a 4-bit field may be utilized for carrying the bearer indicator.

These examples of bearer indicators and fields of a VXLAN header in which a bearer indicator may be set are only a few of the many different types of indicators/fields that may be utilized to provide an end-to-end bearer indication for packets forwarded across an enterprise fabric and are not meant to limit the broad scope of the present disclosure. Virtually any other types of indicators and/or fields may be utilized for any type of tunnel encapsulation in order to provide an end-to-end bearer correlation for traffic of a client.

Various fields as illustrated for the example VXLAN packet 200 of FIG. 2 may be referenced for various discussions provided herein with reference to various example operations (e.g., VXLAN tunnel encapsulations, etc.) that may be provided via system 100 of FIGS. 1A and 1B.

Figure 3A:
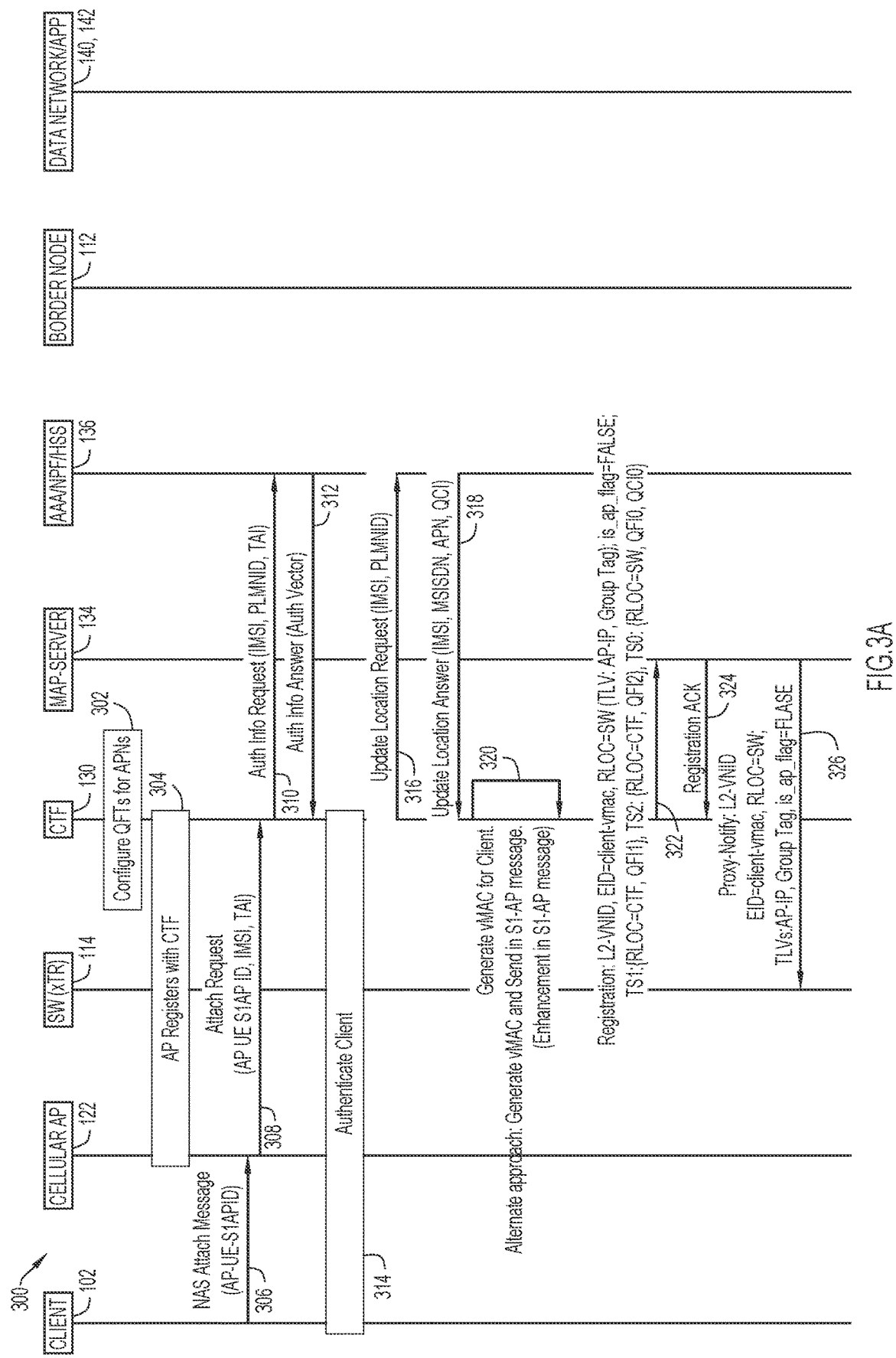
FIGS. 3A, 3B, and 3C are a message sequence diagram illustrating a call flow associated with a default bearer that may be facilitated via the system of FIGS. 1A and 1B, according to an example embodiment.
Figure 3B:
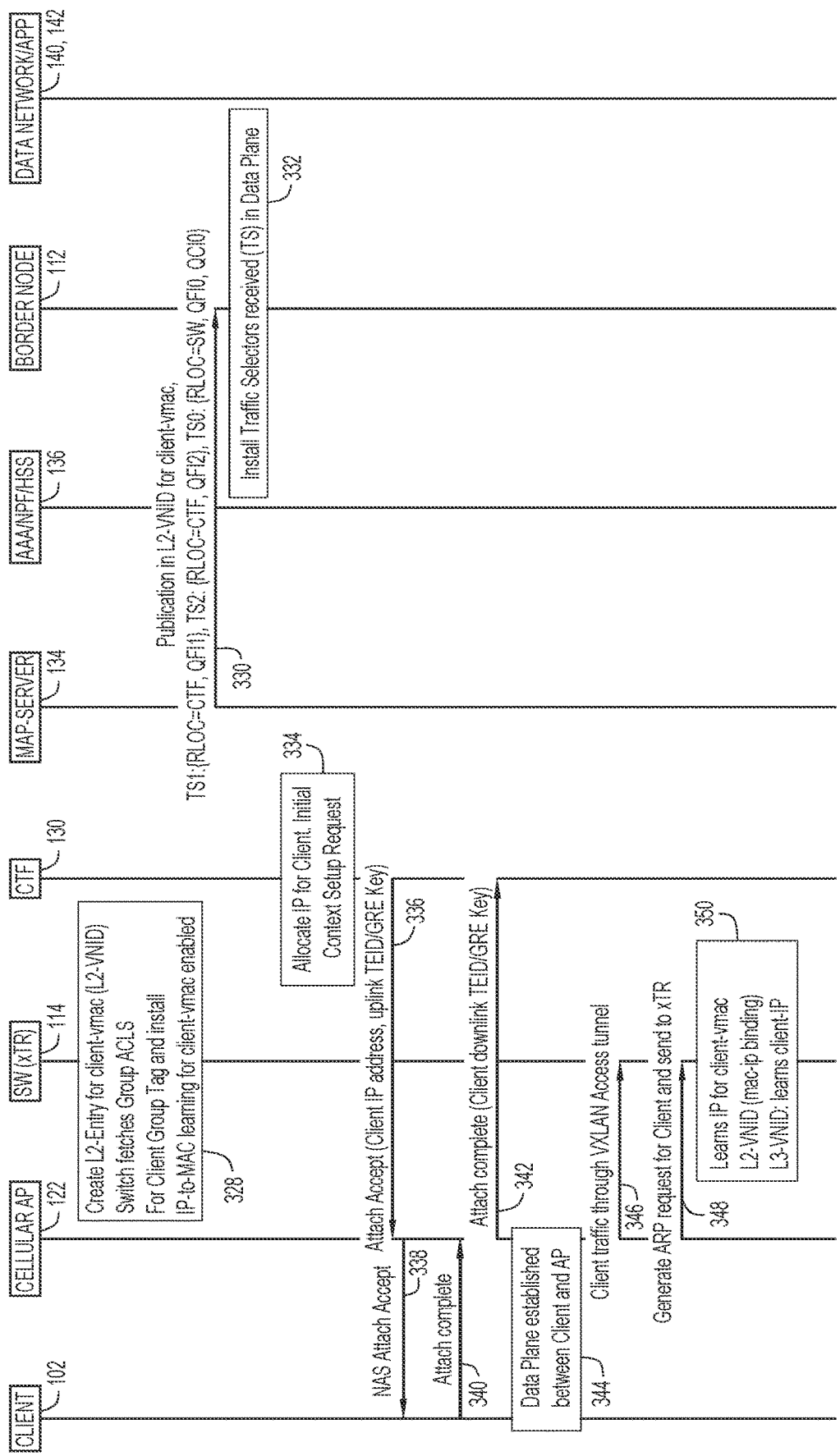
Figure 3C:
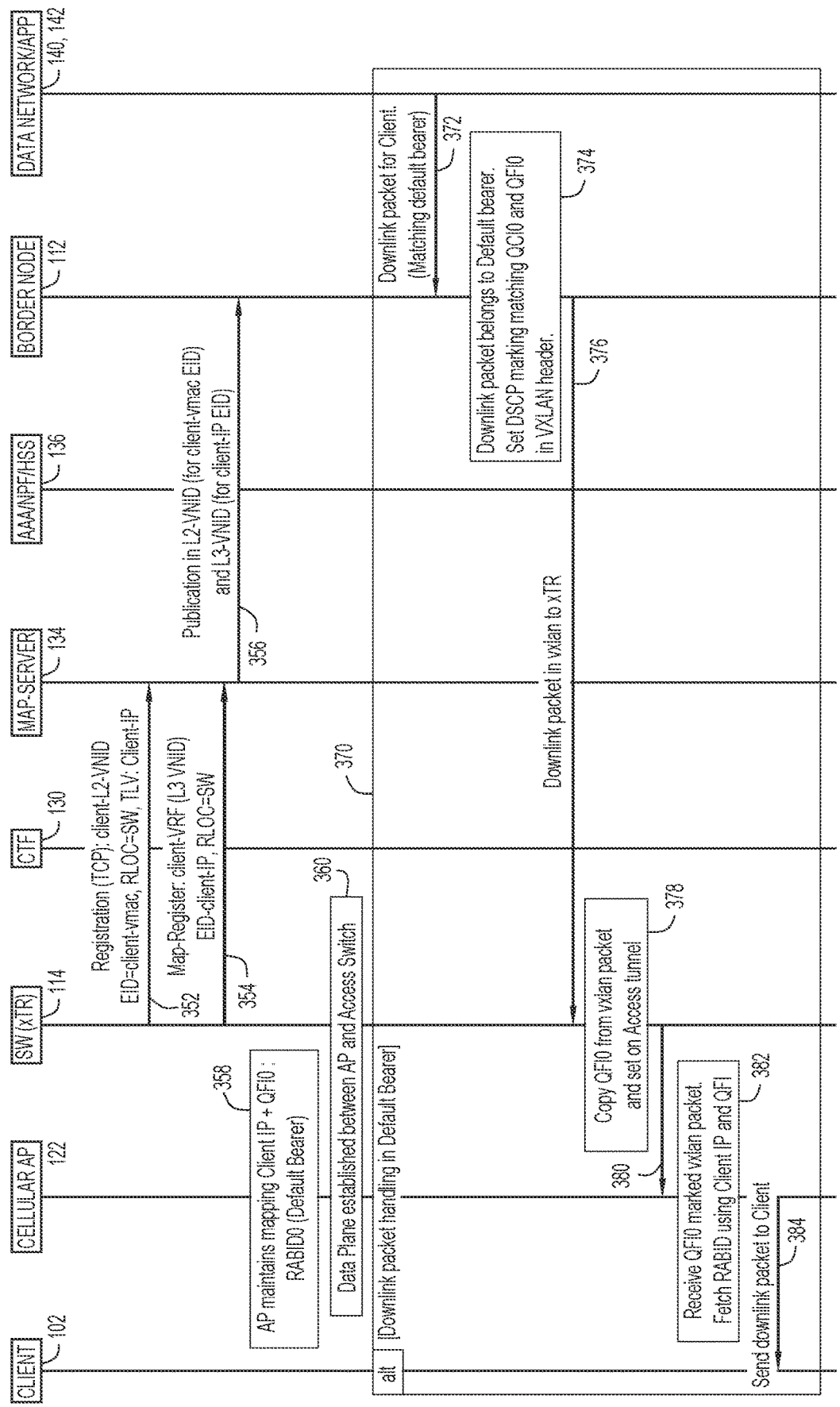

Referring to FIGS. 3A, 3B, and 3C, FIGS. 3A, 3B, and 3C are a message sequence diagram illustrating a call flow 300 associated with a default bearer that may be facilitated via the system 100 of FIGS. 1A and 1B. FIGS. 3A-3C includes client 102, cellular AP 122, SW (xTR) 114, CTF 130, Map-Server 134, AAA/NPF/HSS 136, BN 112, and data network(s)/application(s) 140/142. For the embodiment of FIGS. 3A-3C, consider that cellular AP 122 may be a CBRS-enabled cellular AP. FIGS. 3A-3C are discussed in conjunction with FIG. 3D, which illustrates example details that maybe associated with example virtual MAC (vMAC) address formats 390a and 390b, according to example embodiments.

For FIG. 3A, at 302, CTF 130 is configured with QFTs for each APN supported by CTF 130. In one example, consider that different QFTs may be configured for different APNs such that the configuration for CTF 130 includes QFTs configured for an APN, say, for example, APN=enterprise.com including 3 QFTs, QFT0 {QFI0, QCI0, TS0(Wildcard)}, QFT1{QFI1, QCI1, TS1}, and QFT2{QFI2, QCI2, TS2}. It is to be understood that any number of QFTs can be configured for an APN. Although examples herein discuss CTF 130 being configured with QFTs for APNs, in some embodiments, CTF 130 may obtain QFTs from an external source (e.g., AAA/NPF/HSS 136, a database/repository, another network function, etc.).

At 304, cellular AP 122 is registered with CTF 130. In at least one embodiment, the registration with CTF 130 may include various operations such as, but not be limited to: registering a Layer 3 (L3) EID, such as an IP address of the cellular AP in a L3-EID space (also referred to as the L3 VXLAN Network Identifier (L3-VNID) space) within Map-Server 134; registering a Layer 2 (L2) EID, such as a MAC address of the cellular AP in a L2-EID space (also referred to as the L2-VNID space) within Map-Server 134. In LISP terminology, a VNID is referred to as a LISP Instance-ID (IID). Typically, a LISP IID is rendered into a VXLAN VNID in data plane elements (e.g., xTRs) for encapsulation. Thus, for various examples/discussions provided herein, it is to be understood that a VNID may also refer to a LISP Instance-ID (IID).

Based on the registration, CTF 130 may maintain an EID-to-RLOC mapping in its map-cache in which the IP address for the cellular AP 122 (EID) is mapped to the RLOC (IP address) identifying SW 114. The registration with CTF 130 may also involve creating the VXLAN access tunnel 124 between the cellular AP 122 and SW 114 to which the cellular AP 122 is connected. In at least one embodiment, creating the VXLAN access tunnel 124 may include setting endpoints for the VXLAN access tunnel based on the IP addresses of the cellular AP 122 and SW 114 and setting up encapsulation and decapsulation information for the access tunnel.

Additional details discussed for FIG. 3A with reference to establishing a default bearer for client 102 may include operations associated with generating a virtual MAC (vMAC) address for client 102. As noted above, a virtual MAC address is not an actual predetermined (e.g., factory set, etc.) MAC address of a client, but rather an artificial MAC address that may be created to satisfy operational features for forwarding traffic for the client via enterprise fabric 110. Although details for FIG. 3A may be associated with generating a vMAC for client 102, in some embodiments, a L3 overlay may be provided for enterprise fabric 110 in which no vMAC is generated for client 102; rather, a dummy MAC may be defined that can be utilized, as discussed above in which he dummy MAC can be used to indicate to the edge switch that the access tunnel lookup is to be performed based on IP address of the client 102 and not a MAC address of the client..

Returning to FIG. 3A, consider that a Radio Resource Control (RRC) connection is setup between client 102 and cellular AP 122 and, at 306, client 102 communicates a NAS Attach message to cellular AP 122 including a unique identifier for the client (AP-UE-S1AP ID) over the S1 interface with cellular AP 122, which triggers cellular AP 122 to generate an Attach Request message communicated to CTF 130 at 308 that includes the AP-UE-S1AP ID for client 102, an International Mobile Subscriber Identity (IMSI) associated with client 102, and a Tracking Area Identifier (TAI).

At 310, CTF 130 communicates a DIAMETER-based Authentication-Information-Request (Auth Info Request or 'AIR') message to AAA/NPF/HSS 136 including the IMSI, a Public Land Mobile Network Identity (PLMNID), and the TAI. At 312, AAA/NPF/HSS 136 validates the TAI+PLMNID for the client 102 and generates an authentication vector using authentication techniques such as Evolved Packet System Authentication and Key Agreement (EPS-AKA) functionality that may be facilitated via EPS-AKA logic configured for AAA/NPF/HSS 136. The authentication vector may be represented as {AUTN, RAND, XRES, and KASME}, in which 'AUTN' is an authentication token, 'RAND' is a random challenge, 'XRES' is an expected response to the challenge, and 'KASME' (Access Security Management Entity Key) is a root key. In at least one embodiment, the EPS-AKA logic configured for AAA/NPF/HSS 136 can perform operations for generating the authentication vector according to techniques as prescribed at least by RFC 5448 and RFC 4187.

Although techniques presented herein are discussed with reference to EPS-AKA mechanisms for cellular authentication, this is not meant to limit the broad scope of the present disclosure. In various implementations, other authentication mechanisms/protocols may be utilized (e.g., Extensible Authentication Protocol-Transport Layer Security (EAP-TLS), EAP-Tunneled TLS (EAP-TTLS), etc.) as may be understood in the art, now known here and/or hereinafter developed, which may or may not result in the generation of different authentication vectors/authentication information that may be utilized for authenticating users/devices to various access types.

Upon generation of the authentication vector, AAA/NPF/HSS 136 sends an Authentication-Information-Answer (Auth Info Answer or 'AIA') message to CTF 130 at 312 including the authentication vector. At 314, authentication of the client 102 for the cellular access is performed between CTF 130 and client 102 using the authentication vector. For example, the authentication vector can be used to perform an authentication between the client 102 and the CTF 130 to generate a shared key that can further be used to generate security keys, such as a cipher key (CK) and an integrity key (IK), that can be used to secure AS (Access Stratum) communications between the client 102 and the cellular AP 122 and also to secure NAS (Non-Access Stratum) communications between the client 102 and the CTF 130.

At 316 and 318, the CTF 130 obtains cellular policy information for the client 102. For example, at 316, CTF 130 communicates a DIAMETER-based Update-Location-Request (ULR) message to AAA/NPF/HSS 136 that includes the IMSI and PLMNID, which AAA/NPF/HSS 136 utilizes to authorize client 102 to access/join the enterprise fabric 110 via cellular AP 122. At 318, AAA/NPF/HSS 136 communicates a DIAMETER-based Update-Location-Answer (ULA) to CTF 130 that includes the IMSI, a Mobile Subscriber Integrated Services Digital Network (MSISDN) indicator, the APN (e.g., APN=enterprise.com), and QCI associated with the default bearer for the client. Although examples herein discuss QFTs being configured at CTF 130, in some embodiments CTF 130 may recover QFTs for an APN from any combination of AAA/NPF/HSS 136.

Although DIAMETER-based AIR/AIA ULR/ULA exchanges between CTF 130 and AAA/NPF/HSS 136 are discussed herein, in some embodiments, a RADIUS-based Access Request/Access Accept exchange may also be utilized between CTF 130 and AAA/NPF/HSS 136 to facilitate authentication/authorization of a client seeking cellular access to the enterprise fabric 110 in which such information may be carried between the CTF 130 and the AAA/NPF/HSS 136 via Access Request/Access Accept messages.

In some embodiments, such as for the embodiment of FIG. 3A, CTF 130 may be configured with cellular and/or enterprise policy information for clients, such as enterprise group tag or indicator and enterprise group access control list information. Generally, enterprise group tags or indicators may be used to identify security information, policy information, access information, authorization information, etc. for different client groups (e.g., employees, types/classes/ranks of employees, types/classes/ranks of network devices (e.g., print devices, storage devices, primary/backup devices, etc.), or the like) that may connect to an enterprise fabric provided by an enterprise. Group tags may be associated with a group access control list (ACL), which can be used to enforce enterprise policy within enterprise fabric 110. In some implementations, group tags may be implemented as Cisco® scalable or security group tags (SGTs) in association with a security or scalable group access control list (SGACL).

For embodiments in which CTF 130 is not configured with enterprise group information for client 102, CTF 130 query AAA/NPF/HSS 136 for policy information for client 102. For example, CTF may communicate a policy request to AAA/NPF/HSS 136 that includes an enterprise-based identifier for the client 102, such as a Network Access Identifier (NAI) for the client (e.g., 'NAI=client@enterprise.com') to which AAA/NPF/HSS 136 can respond with a policy answer message to CTF 130 that includes policy information for the client such as the QCI and the enterprise group tag for client 102. It is to be understood that other policy information for the client can be included in the policy answer.

Although details herein are discussed with reference to an IMSI being included in CTF 130 messaging to AAA/NPF/HSS 136, it is to be understood that any client identifier that may be obtained from a client or otherwise determined for the client may be utilized for such CTF messaging including, but not limited to, NAI as typically used for enterprise WLAN/wired accesses, International Mobile Equipment Identity (IMEI), IMEI software version (IMEISV), Permanent Equipment Identifier (PEI), Subscription Concealed Identifier (SUCI), Universally Unique Identifier (UUID), station (STA) serial number, factory configured MAC address, any other stable or permanent identifier for the client, combinations thereof, and/or the like now known or hereafter developed. As referred to herein, a stable identifier for a client may refer to a client identifier that consistently identifies the client for a particular system (e.g., enterprise fabric 110) and a permanent identifier for a client may refer to a client identifier that consistently identifies the client across multiple systems (e.g., fabrics for multiple enterprises, mobile service providers, etc.).

Figure 3D:
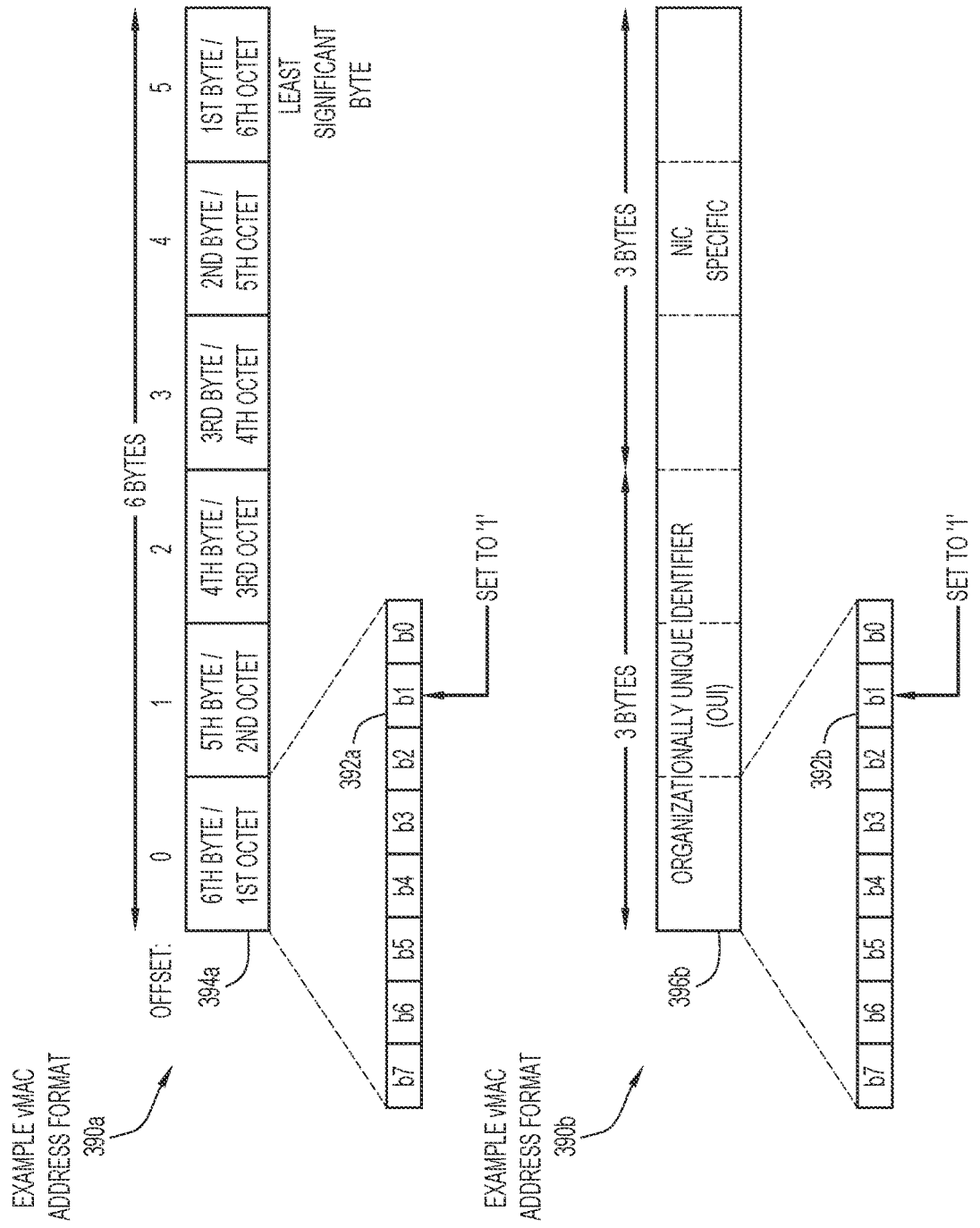
FIG. 3D is a schematic diagram illustrating example details that may be associated with example virtual Media Access Control (vMAC) address formats, according example embodiments.

At 320, CTF 130 generates a vMAC for client 102. CTF 130 can generate a vMAC for each client that seeks to attach to enterprise fabric 110 via the cellular access. Different example vMAC address formats 390a and 390b are illustrated in FIG. 3B. In at least one embodiment, the vMAC address may be a 48-bit MAC address that can be generated based on the following criteria: a) using any of: an MME Temporary Mobile Subscriber Identity (M-TMSI); a System Architecture Evolution (SAE) Temporary Mobile Subscriber Identity (S-TMSI); or an MME UE S1AP ID (as assigned to the client by the CTF 130) as the seed for generating a hash used for vMAC address generation; b) setting the local bit 'L' to '1' to make the vMAC address unique within the local scope of enterprise fabric 110; and c) ensuring there are no vMAC address conflicts among clients. In one example vMAC address format 390a, as illustrated in FIG. 3D, Bit 1 (the local bit) labeled 392a in FIG. 3D in a first octet 394a of the example vMAC address format 390a may be set to '1'.

In another example vMAC address format 390b, the vMAC address may be generated as a 48-bit combination of (i) a 24-bit reserved IEEE organizationally unique identifier (OUI) (shown in FIG. 3D as OUI 396b) with the local bit (392b) set to '1', followed by (ii) a 24-bit hash of at least a portion of the M-TMSI or S-TMSI, which may represent a 24-bit extension identifier.

The M-TMSI is used to identify the client within the CTF 130 and is typically 32-bits. The S-TMSI is typically constructed from an MME Code (MMEC) and the M-TMSI. The MME UE S1AP ID can be allocated by CTF 130 and can be used to uniquely identify the client over the S1 interface within the CTF 130. The cellular AP 122 can obtain the MME UE S1AP ID from CTF 130 via S1AP signaling.

The cellular AP 122 is to obtain the vMAC address for the client 102 in order to maintain a mapping between the vMAC address and TEID(s) for bearer(s) established for the client 102 in order to include the vMAC in the Ethernet/MAC header of every uplink user plane packet received from the client 102 that is forwarded to enterprise fabric 110 (e.g., to SW 114).

There may be multiple approaches to the vMAC address generation and the cellular AP 122 obtaining the vMAC address. For example, one approach may include the CTF 130 generating the vMAC address for a client (e.g., client 102) and sending the vMAC address for the client 102 to cellular AP 122 over the S1-MME/N2 interface interfacing CTF 130 and cellular AP 122. In another approach, the cellular AP 122 and the CTF 130 may each independently generate the same vMAC address by using the same hash, which may be based the MME UE S1AP ID obtained by the cellular AP 122 over the S1-MME/N2 interface. In yet another approach, the cellular AP 122 may use some stable identifier for the client 102 for vMAC generation.

Broadly, operations 322-360 illustrate example details associated with registering EID-to-RLOC mappings for the client 102 with Map-Server 134 as well as configuring the EID-to-RLOC mappings for client 102 with BN 112 and SW 114 to facilitate data plane connectivity for the client 102 via enterprise fabric 110.

For example, at 322, CTF 130 registers the generated client 102 vMAC (referred to herein as 'Client-vMAC' or 'client-vmac') as the EID in the L2-VNID space with Map-Server 134 including the following information: EID=Client-vMAC; RLOC=SW(Type-Length-Value (TLV): AP-IP; Group Tag); a flag 'IS_AP_FLAG=FALSE' indicating to Map-Server 134 that the registration is not associated with an AP; and the Traffic Selectors associated with each QFI, represented as TS 1 {RLOC=CTF, QFI1}, TS2:{RLOC=CTF, QFI2}, TS3:{RLOC=SW, QFI0, QCI0}. At 324, Map-Server 134 responds with an acknowledgement (ACK).

At 326, Map-Server 134 sends a Proxy-Notify to SW 114 including certain information for the L2-VNID space such as EID=Client-vMAC; RLOC=FES(Type-Length-Value (TLV): AP-IP; Group Tag); a flag 'IS_AP_FLAG=FALSE' that triggers SW 114 at 328 to create a L2 entry for the Client-vMAC (in the L2-VNID space) in its local map-cache. Additionally at 328, SW 114 fetches the group ACLs for the client enterprise Group Tag and installs the ACLs. The SW 114 is now aware of the vMAC address and the group tag of the client 102.

Further at 328, as shown in FIG. 3B, SW 114 enables an IP-to-MAC learning process for the client vMAC address in order to determine the IP address associated with the client 102. At 330, Map-Server 134 performs a Publication in the L2-VNID space to BN 112 for the Client-vMAC that includes the Traffic Selectors associated with each QFI, TS1 {RLOC=CTF, QFI1}, TS2:{RLOC=CTF, QFI2}, TS3: {RLOC=SW, QFI0, QCI0} which triggers the BN 112 to install the received Traffic Selectors in the data-plane at 332 for identifying/matching received packets to a corresponding QFI/QCI for client 102 in the local map-cache for BN 112.

In some embodiments, operations may not involve IP-to-MAC learning for a client at SW 114. For example, for fabric deployments utilizing a L3 overlay, there is no MAC or vMAC associated with a client and so consideration involving vMAC to IP relation on the SW 114 is not applicable. For the IP only devices/clients for an L3 overlay, the CTF 130 can push the IP to RLOC relations to Map-Server 134 that, in turn, can push the same to SW 114 and to BN 112.

Returning to the present example, at 334, CTF 130 allocates an IP address for the client 102 (referred to herein as 'Client-IP'). CTF 130 also triggers an initial context setup request for the client 102, which includes communicating an Attach Accept message to cellular AP 122 at 336 that includes the IP address allocated for the client 102 and an uplink TEID/GREKey for the default bearer for client 102.

The cellular AP 122 communicates a NAS Attach Accept message to the client 102 at 338 and the client responds with an Attach Complete message at 340. The cellular AP 122 communicates the Attach Complete message to the CTF 130 including a client downlink TEID/GREKey at 342. An Attach Accept or Attach Complete message for 3GPP implementations typically includes a GPRS TEID/GREKey (uplink or downlink) included in a corresponding field of the message. For some embodiments herein, such a TEID/GREKey field may include a bearer indicator such as the QFI or some other bearer indicator for the client 102 session. For embodiments in which a downlink TEID for a bearer may be used as a bearer indicator by BN 112, the CTF 130 may update a EID-to-RLOC mapping for the client 102 with Map-Server 134, which can push the downlink TEID to BN 112, using techniques as discussed herein (e.g., via one or more Publication communications). Additionally, uplink and/or downlink TEIDs may be pushed to any enterprise fabric 110 data plane nodes, such as SW 114 using techniques as discussed herein.

The data plane is established between the client 102 and the cellular AP 122 following these procedures, as shown at 344, and client traffic can be sent to the cellular AP via the VXLAN access tunnel 124, as shown at 346.

For some implementations of the IP-to-MAC learning operations involving SW 114, the cellular AP 122 at 348 may generate a gratuitous ARP request on behalf of the client 102 and sends an ARP request message (packet) over the VXLAN access tunnel 124 to SW 114. The packet includes the IP address and the vMAC of the client 102. The message can be obtained by the SW 114, which completes the IP-to-MAC learning process for the client 102 IP address by the SW 114, as shown at 350. For other implementations, the need for a gratuitous ARP from cellular AP 122 can be eliminated.

In another approach, the cellular AP 122 can send a Proxy ARP request for the gateway's IP over the VXLAN access tunnel in which the request ARP message can include the IP address and the vMAC address of the client 102 such that the SW 114 may be made aware of the IP/vMAC of the client.

At 352, as shown in FIG. 3C, the SW 114 performs a Transmission Control Protocol (TCP)-based registration with Map-Server 134 in which the L2-VNID space includes the EID=Client-vMAC and RLOC=SW, TLV: Client-IP. At 354, SW 114 performs a registration with Map-Server 134 in which the L3-VNID space includes the EID=Client-IP and RLOC=SW for virtual routing and forwarding (VRF). The Map-Server 134 now has a MAC-RLOC map entry for the client 102. At 356, Map-Server 134 performs a Publication in the L2-VNID space for the Client-vMAC EID and in the L3-VNID space for the Client-IP EID, which triggers the BN 112 to update the EID-to-RLOC mappings for the client 102 in its local map-cache.

For embodiments in which no vMAC address is generated for the client 102, such as for L3 overlay implementations, no EID-to-RLOC mapping for the client vMAC may be registered with Map-Server 134; thus, operations discussed at 320, 322, 324, 326, 328 and also corresponding IP-to-MAC learning operations as discussed at 346, 348, 350, 352, 354, and 356 may be eliminated with the exception that SW 114 is still to fetch and install the enterprise group ACLs for the client 102 enterprise group. For such embodiments, an EID-to-RLOC mapping can be registered in the L3-VNID space for Map-Server 134, which information can be pushed to SW 114 and BN 112 to facilitate VXLAN fabric tunnel 118 connectivity for client 102.

Returning to the present example, at 358, the cellular AP 122 creates/maintains a mapping between the client 102 IP address+QFI0 and RABID for the default bearer, RABID0. The cellular AP 122 may also create/maintain a mapping between the TEID(s) and the vMAC for client 102 including the vMAC in uplink packets received from client 102 that are forwarded to enterprise fabric. In general, the cellular AP 122 will maintain a relation between the client IP and/or vMAC (if used) and elements that can be used for bearer identification such as TEIDs, RAB IDs, QFIs, etc. As there may be multiple TEIDs for a client based on the bearers created for the client (e.g., a default bearer and optionally one or more dedicated bearers), the cellular AP 122 can distinguish a corresponding RAB ID for downlink packets that are to be transmitted to the client based on the 'hint' or bearer indicator included in the VXLAN header for a downlink packet received from SW 114. Upon completion of the default bearer creation process, the data plane is established between the cellular AP 122 and the SW 114, as shown at 360.

Various additional default bearer packet forwarding operations are illustrated at 370. For example, as shown at 372, consider that a downlink packet is received by BN 112 matching the default bearer for client 102. At 374, BN 112 can determine that the downlink packet matches the default bearer for the client based on QoS Traffic Flow Template (TFT) information maintained at the BN 112. Based on the determining that the downlink packet belongs to the default bearer, the BN 112 can encapsulate the packet in a VXLAN tunnel encapsulation and, based on determining the matching Traffic Selector for the default bearer (TS0, in this example), setting the DSCP marking matching QCI0 for the encapsulated packet, and setting the bearer indicator (QFI0, in this example) in the VXLAN header for the encapsulated packet.

The RLOC=SW (192.0.0.254) can be set in the outer DST IP address field for the encapsulated packet and the BN 112 forwards the downlink packet toward SW 114 via the VXLAN fabric tunnel 118, as shown at 376. Upon obtaining the downlink packet, cellular AP 122 can copy the bearer indicator and the DSCP/QCI marking from the VXLAN tunnel encapsulation (QFI0, in this example), re-encapsulate the packet in another VXLAN tunnel encapsulation for VXLAN access tunnel 124, include the bearer indicator in the VXLAN header and the DSCP/QCI marking in the outer IP header, and forward the downlink packet to cellular AP 122 as shown at 378 and 380. At 382, cellular AP 122 obtains the downlink packet, identifies (fetches) the corresponding RABID using the client IP address contained in the downlink packet and the bearer indicator (e.g., QFI) contained in the VXLAN header, decaps the downlink packet, and, as shown at 384, sends the downlink packet to the client 102 using the default radio bearer.

Figure 4A:
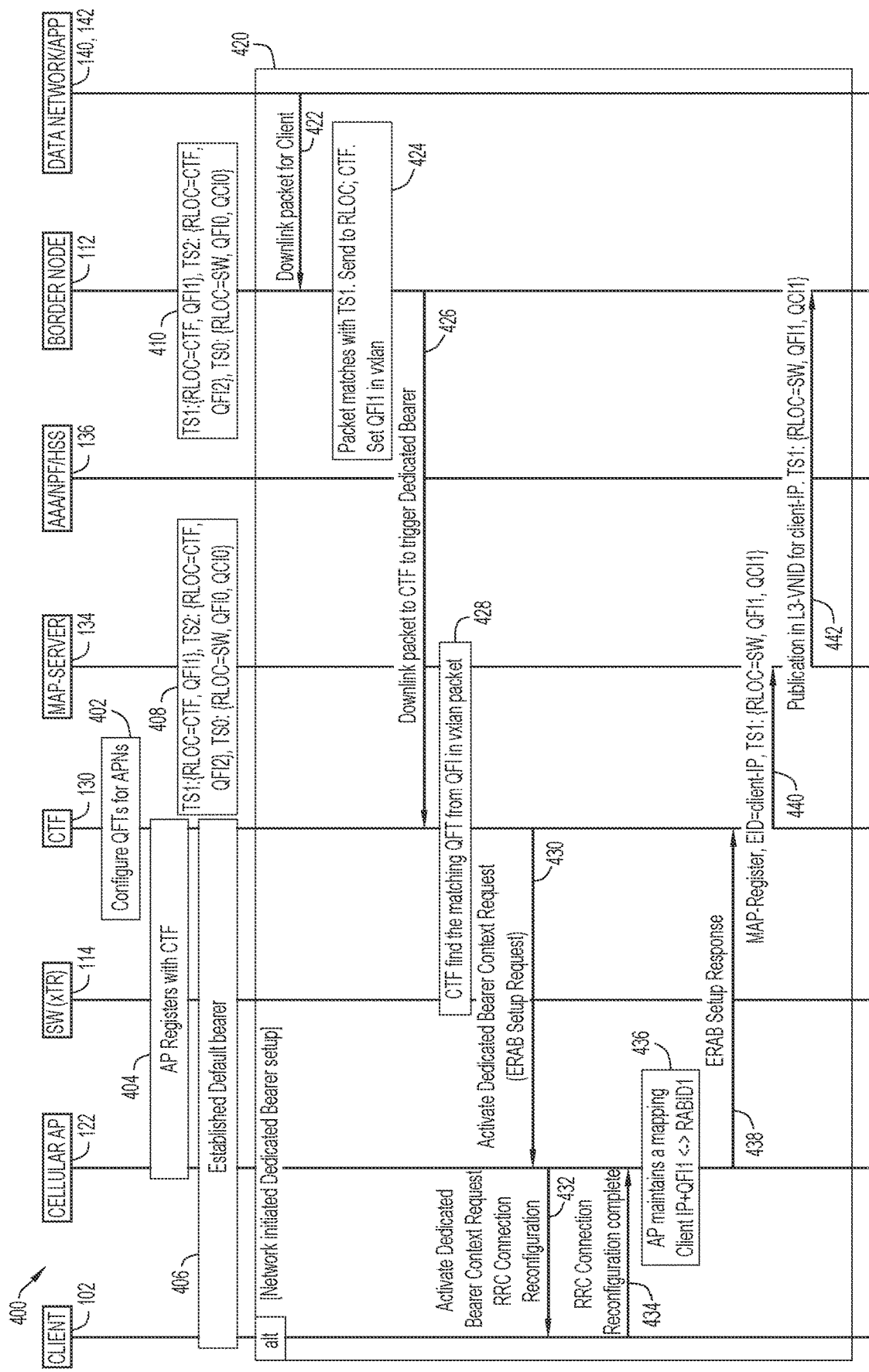
FIGS. 4A and 4B are a message sequence diagram illustrating a call flow associated with a network-initiated dedicated bearer that may be facilitated via the system of FIGS. 1A and 1B, according to an example embodiment.
Figure 4B:
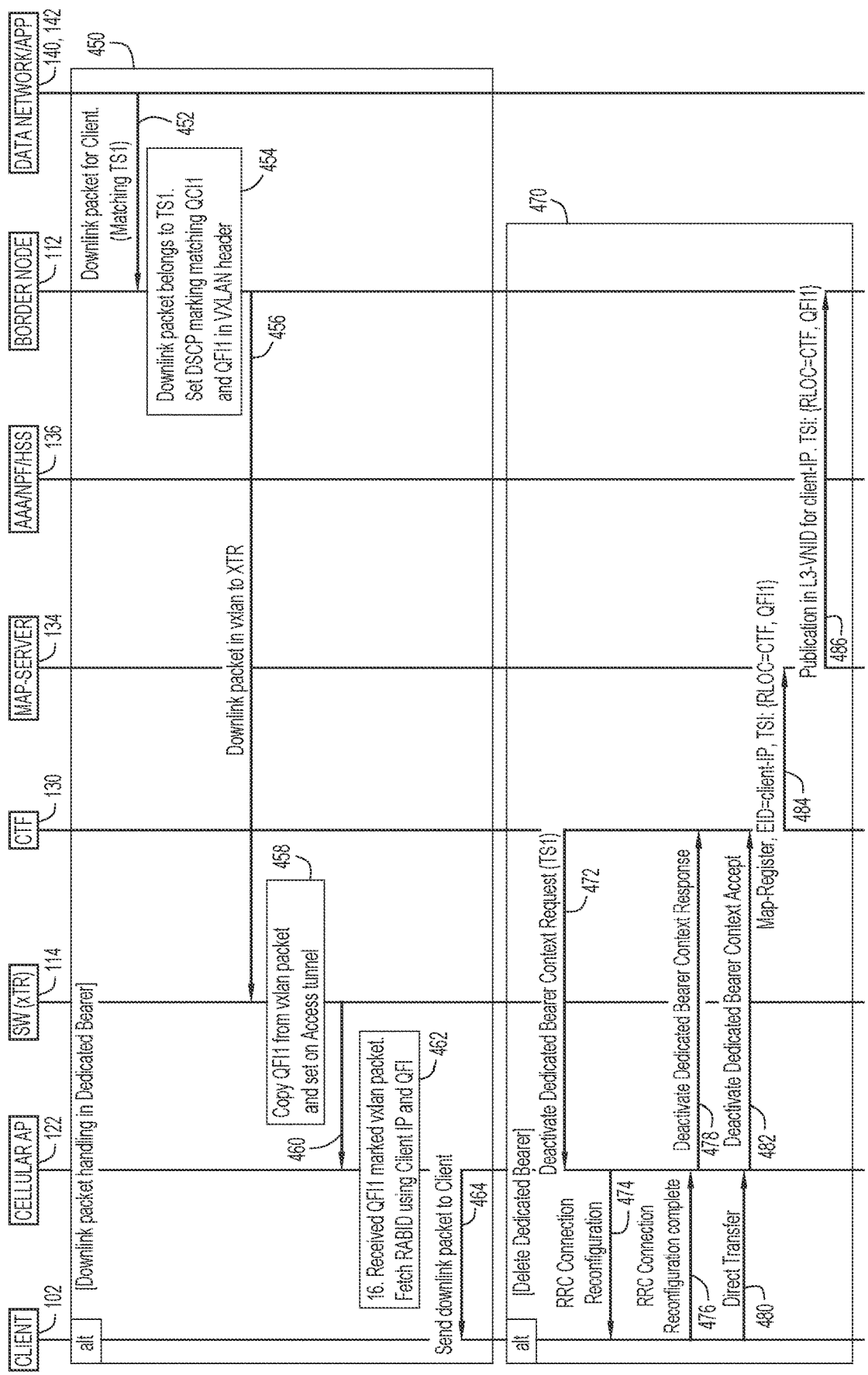

Referring to FIGS. 4A and 4B, FIGS. 4A and 4B is a message sequence diagram illustrating a call flow 400 associated with a network-initiated dedicated bearer that may be facilitated via the system of FIGS. 1A and 1B, according to an example embodiment. FIGS. 4A and 4B includes client 102, cellular AP 122, SW (xTR) 114, CTF 130, Map-Server 134, AAA/NPF/HSS 136, BN 112, and data network(s)/application(s) 140/142. For the embodiment of FIGS. 4A-4B, consider that cellular AP 122 may be a CBRS-enabled cellular AP.

For FIG. 4A, at 402, CTF 130 is configured with QFTs for each APN supported by CTF 130 (e.g., as discussed above at 302 of FIG. 3A). At 404, cellular AP 122 is registered with CTF 130, as discussed above at 304 of FIG. 3A. For FIG. 4A, consider that a default bearer is established for client 102 at 406 and that EID-to-RLOC mapping information for the QFTs for client 102 is provided for Map-Server 134 at 408 and also for BN 112 at 410, which operations can be performed using techniques as discussed above for FIG. 3A.

Operations 420 illustrate example details associated with creating a dedicated bearer for client 102 and updating EID-to-RLOC mapping information for the client 102 based on the dedicated bearer creation, according to an example embodiment. At 422 and 424, consider that a downlink packet is received by BN 112 matching a dedicated bearer for client 102, which matches Traffic Selector TS1 for the dedicated bearer.

Consider for the example embodiment illustrated at 420 that the operations include BN 112 providing a VXLAN tunnel encapsulation for the packet that includes a bearer indicator (QFI1, in this example) in the VXLAN header and forwards the packet to CTF 130 at 426 based on the RLOC=CTF for TS1 to trigger dedicated bearer creation for client 102 via CTF 130.

Although the embodiment of FIGS. 4A and 4B illustrates features associated with forwarding a downlink packet to CTF to trigger dedicated bearer creation, recall that other alternatives may be implemented such as, for example, sending a control plane message to CTF 130 to trigger dedicated bearer creation (based on an RLOC=BN being set) and buffering packets at BN 112 until the bearer is created and the EID-to-RLOC mapping is updated for forwarding the packets across enterprise fabric 110 or sending a LISP Map Register to Map-Server 134 (based on an RLOC=Map-Server being set) in which the Map-Server 134 can trigger dedicated bearer creation at CTF. Other variations can be envisioned for triggering dedicated bearer creation within enterprise fabric 110.

Returning to FIG. 4A, CTF 130 determines the matching QFT from the bearer indicator in the VXLAN packet at 428, which triggers CTF 130 to initiate dedicated bearer creation for the client 102. The dedicated bearer can be created for the client 102, as shown at 430, using an Evolved-Universal Mobile Telecommunications Service (UMTS) Terrestrial Radio Access Network (E-UTRAN) RAB (ERAB) Create setup request communicated to cellular AP 122 for an activate dedicated bearer context request communication. An RRC connection reconfiguration exchange is performed between the cellular AP 122 and the client 102 as shown at 432 and 434 to establish the RAB (identified as RABID1, in this example). As shown at 436, cellular AP 122 maintains a mapping between the client 102 IP address+QFI1 and RABID1 for the dedicated bearer. At 438, cellular AP sends an ERAB setup response to CTF 130, which triggers CTF 130 to send a LISP Map Register communication to Map-Server 134 at 440 to update the EID-to-RLOC mapping for the EID=Client-IP for TS1 in which {RLOC=SW, QFI1, QCI1}. Based on the updated EID-to-RLOC mapping, Map-Server 134 performs a Publication in the L3-VNID space for EID=Client IP maintained by BN 112 to reflect the updated {RLOC=SW, QFI1, QCI1}, as shown at 442.

Various additional dedicated bearer packet forwarding operations are illustrated at 450 in FIG. 4B. Operations as illustrated at 452, 454, 456, 458, 460, 462, and 464 for the dedicated bearer may be performed in a similar manner as discussed above at 370 of FIG. 3C for the default bearer forwarding operations except that the bearer indicator and QCI set for the dedicated bearer for operations 450 may be associated with TS1 (e.g., QCI1 and QFI1) as may be configured for system 100.

Various dedicated bearer termination operations are illustrated at 470. Generally, any time that an xTR (e.g., SW 114) detects that a flow is no longer active for which there is an active bearer, the xTR will delete the bearer and update the Map-Server 134 to the default RLOC for that flow (e.g., RLOC=CTF, RLOC=BN, RLOC=Map-Server, etc. depending on implementation). Further, any time either there is an explicit deletion of a bearer, the default RLOC will be set as the RLOC for that EID (IP+TS); thereby re-establishing the path for detecting a new flow and triggering a bearer creation action towards the client.

Consider for the present example, that SW 114 detects that the flow associated with TS1 is no longer active and, at 472, sends a request to deactivate the dedicated bearer context for TS1 to cellular AP 122. Operations at 474, 476, 478, 480, and 482 may involve deactivating the dedicated bearer/bearer context for client 102, as may be prescribed at least by 3GPP TS 24.301.

Upon receiving an indication by CTF 130 that the dedicated bearer context has been deactivated at 482, CTF 130 may send a LISP Map Register communication to Map-Server 134 at 484 to update the EID-to-RLOC mapping for the EID=Client-IP for TS1 in which {RLOC=CTF, QFI1} (the default RLOC for the present example). Based on the updated EID-to-RLOC mapping, Map-Server 134 performs a Publication in the L3-VNID space for EID=Client IP maintained by BN 112 to reflect the updated {RLOC=CTF, QFI1} for TS1, as shown at 486.

Figure 5A:
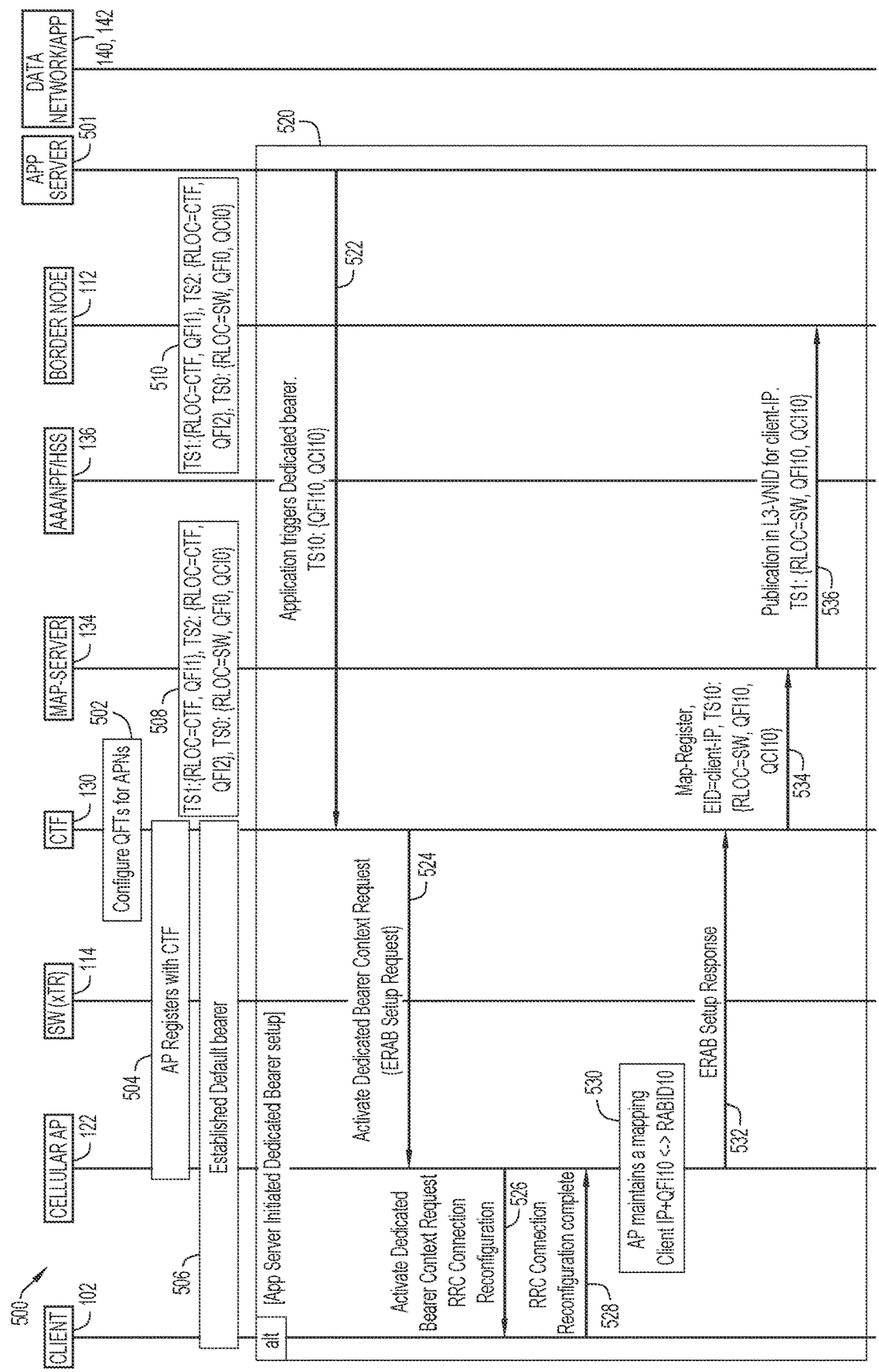
FIGS. 5A, 5B, and 5C are a message sequence diagram illustrating a call flow associated with an application server-initiated dedicated bearer that may be facilitated via the system of FIGS. 1A and 1B, according to an example embodiment.
Figure 5B:
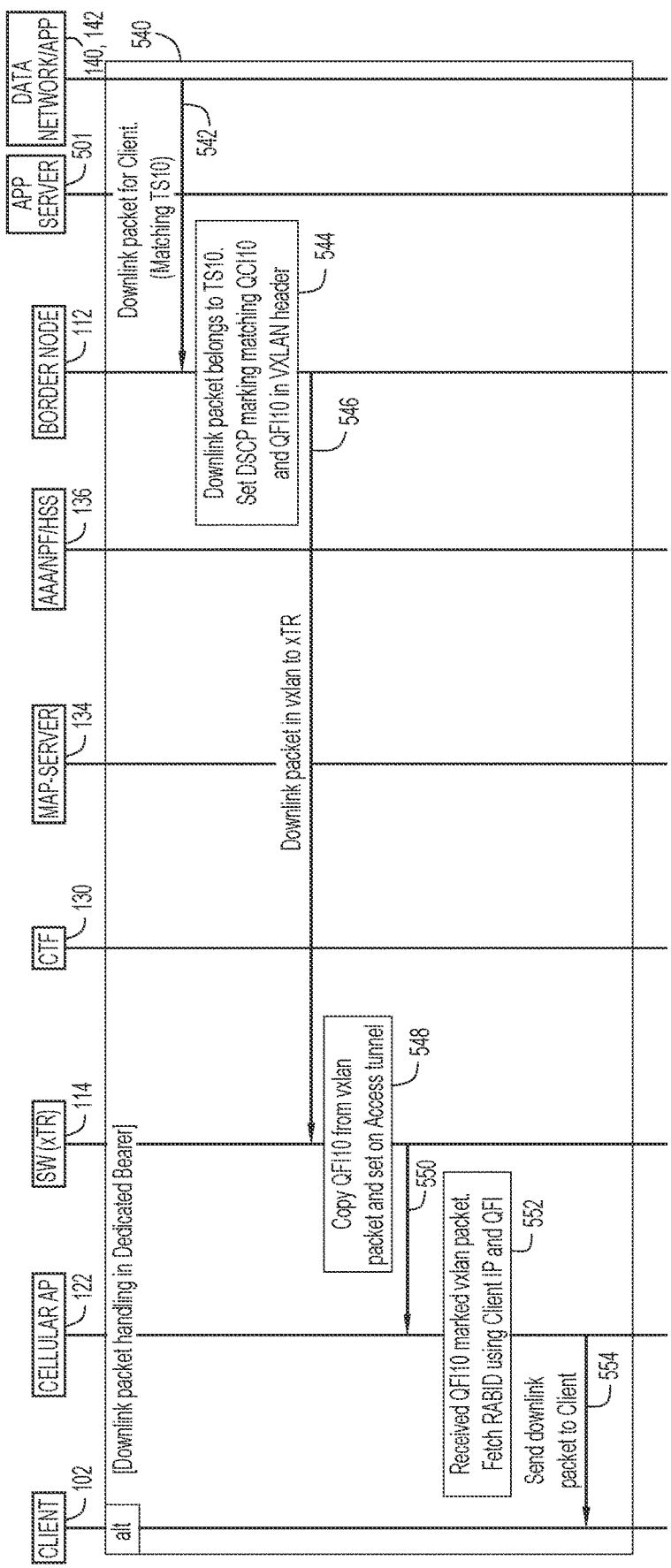
Figure 5C:
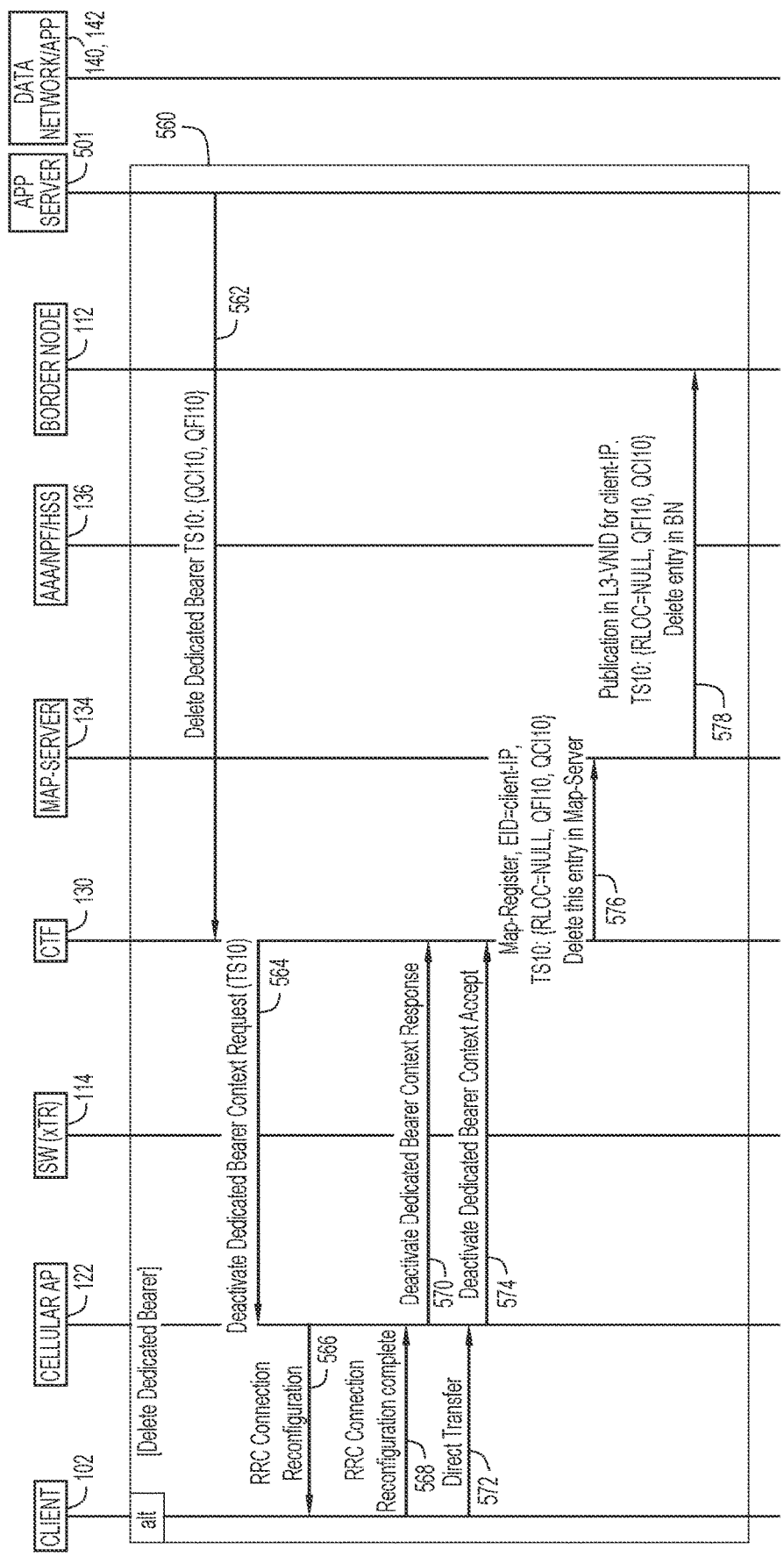

Referring to FIGS. 5A, 5B, and 5C, FIGS. 5A, 5B, and 5C are a message sequence diagram illustrating a call flow 500 associated with an application server-initiated dedicated bearer that may be facilitated via system 100 of FIGS. 1A and 1B, according to an example embodiment. FIGS. 5A-5C include client 102, cellular AP 122, SW (xTR) 114, CTF 130, Map-Server 134, AAA/NPF/HSS 136, BN 112, and data network(s)/application(s) 140/142. Also shown in FIGS. 5A-5C is an application server 501, which may be an application server associated with one or more of applications 142(1)-142(3). For the embodiment of FIGS. 5A-5C, consider that cellular AP 122 may be a CBRS-enabled cellular AP.

For FIG. 5A, at 502, CTF 130 is configured with QFTs for each APN supported by CTF 130 (e.g., as discussed above at 302 of FIG. 3A). At 504, cellular AP 122 is registered with CTF 130, as discussed above at 304 of FIG. 3A. For FIG. 5A, consider that a default bearer is established for client 102 at 506 and that EID-to-RLOC mapping information for the QFTs for client 102 is provided for Map-Server 134 at 508 and also for BN 112 at 510, which operations can be performed using techniques as discussed above for FIG. 3A.

Operations 520 illustrate example details associated with creating a dedicated bearer for client 102 based on an application server 501 trigger and updating EID-to-RLOC mapping information for the client 102 based on the dedicated bearer creation, according to an example embodiment. At 522, consider that application server 501 communicates a trigger to CTF 130 for creation of a dedicated bearer having a Traffic Selector TS10 associated with a QCI10 and a bearer indicator of QFI10. The dedicated bearer for the client 102 can be created as shown at 524, 526, 528, and 532, which respective operations may be performed in a similar manner as discussed above at respective operations 430, 432, 434, and 438 of FIG. 4A, except that the operations of FIG. 5A may be associated with the dedicated bearer having a RAB ID identified as RABID10 in which the cellular AP 122 may maintain a mapping between the client 102 IP address+QFI10 and RABID10 for the dedicated bearer, as shown at 530.

Based on receiving the ERAB setup response at 532, CTF 130 send a LISP Map Register communication to Map-Server 134 at 534 to register an EID-to-RLOC mapping for the EID=Client-IP for TS10 in which {RLOC=SW, QFI10, QCI10}. Based on the new EID-to-RLOC mapping, Map-Server 134 performs a Publication in the L3-VNID space for EID=Client IP maintained by BN 112 to install the Traffic Selector TS10 with {RLOC=SW, QFI10, QCI10}, as shown at 536.

Various additional dedicated bearer packet forwarding operations are illustrated at 540 of FIG. 5B, including operations, 542, 544, 546, 548, 550, 552, and 554 which may be performed similar to other example packet forwarding operations discussed herein, except that the bearer indicator and QCI set for the dedicated bearer for operations 540 may be associated with TS10 (e.g., QCI10 and QFI10).

Various dedicated bearer termination operations are illustrate at 560, which may be performed similar to other example bearer termination operations as discussed above at 470 of FIG. 4B, except that the bearer termination operations of FIG. 5C may involve an explicit bearer termination indication being sent from application server 501 to CTF 130 for TS10, as shown at 562. The remaining operations 564, 566, 568, 570, 572, and 574 of FIG. 5C may be performed similar to the bearer termination operations as discussed above for FIG. 4B.

Upon receiving an indication by CTF 130 that the dedicated bearer context has been deactivated at 574, CTF 130 may send a LISP Map Register communication to Map-Server 134 at 576 to delete the EID-to-RLOC mapping for the EID=Client-IP for TS10 in Map-Server 134 in which {RLOC=NULL, QFI10, QCI10}. Based on deletion of the EID-to-RLOC mapping, Map-Server 134 performs a Publication in the L3-VNID space for EID=Client-IP maintained by BN 112 to delete the entry associated with TS10, e.g., {RLOC=NULL, QFI10, QCI10}, as shown at 578.

Figure 6A:
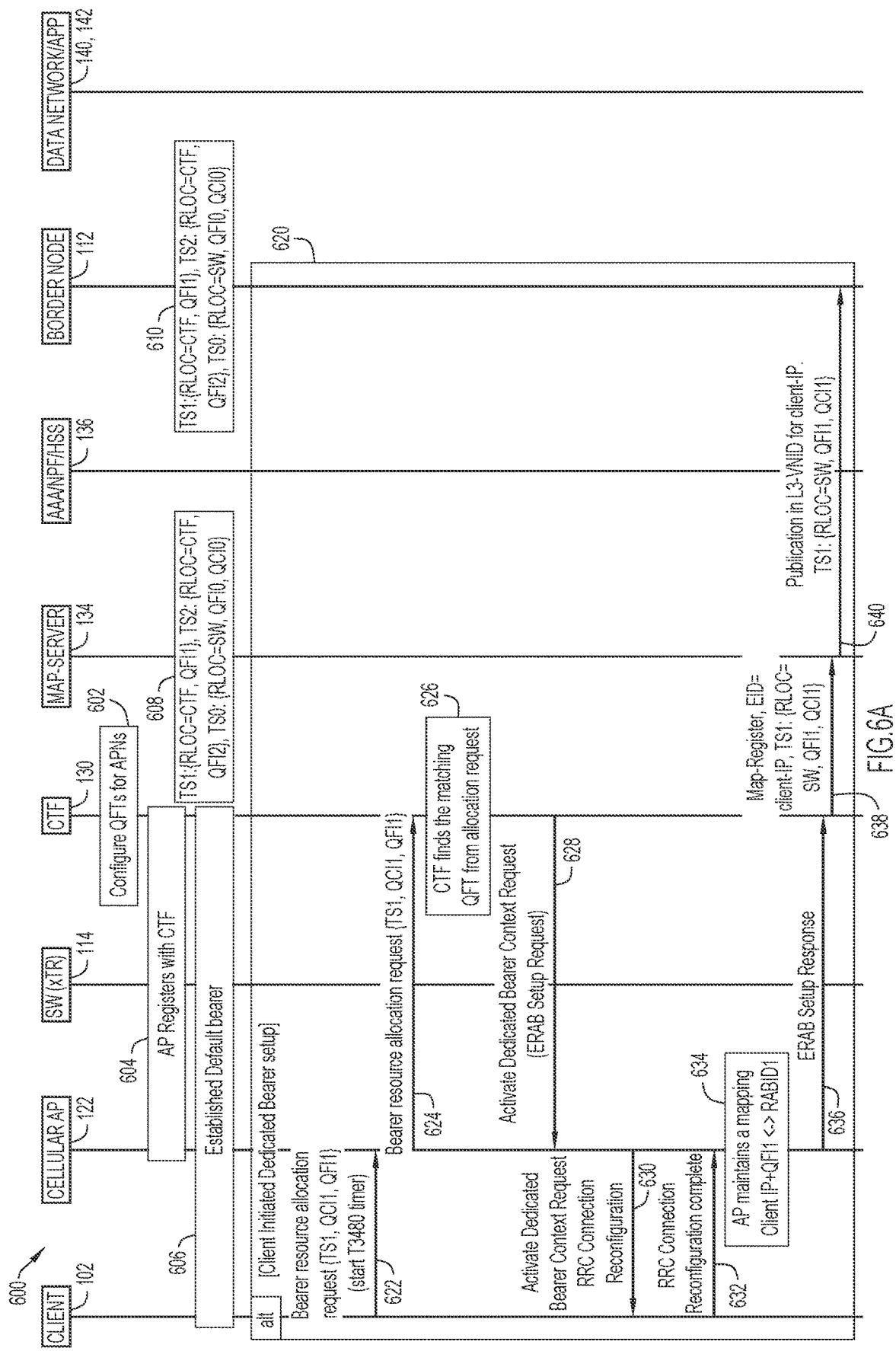
FIGS. 6A, 6B, and 6C are a message sequence diagram illustrating a call flow associated with a client-initiated dedicated bearer that may be facilitated via the system of FIGS. 1A and 1B, according to an example embodiment.
Figure 6B:
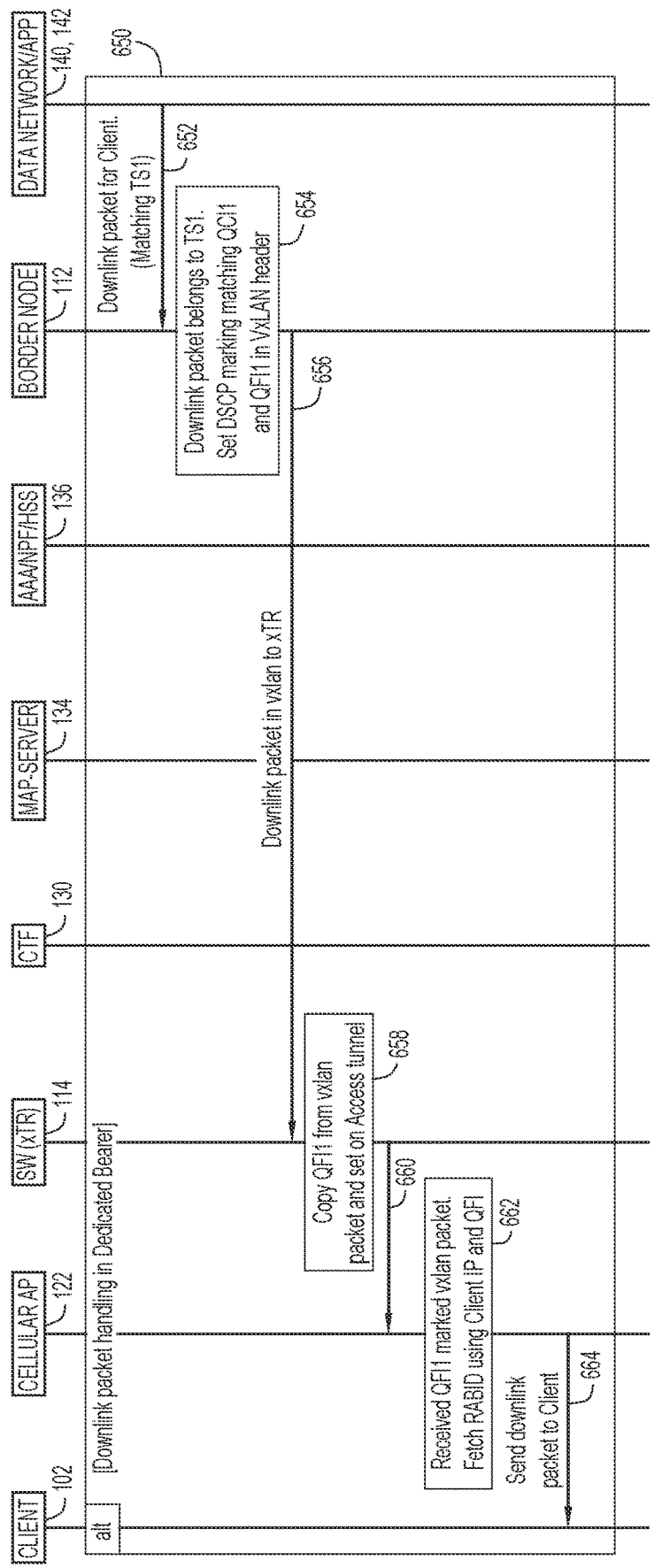
Figure 6C:
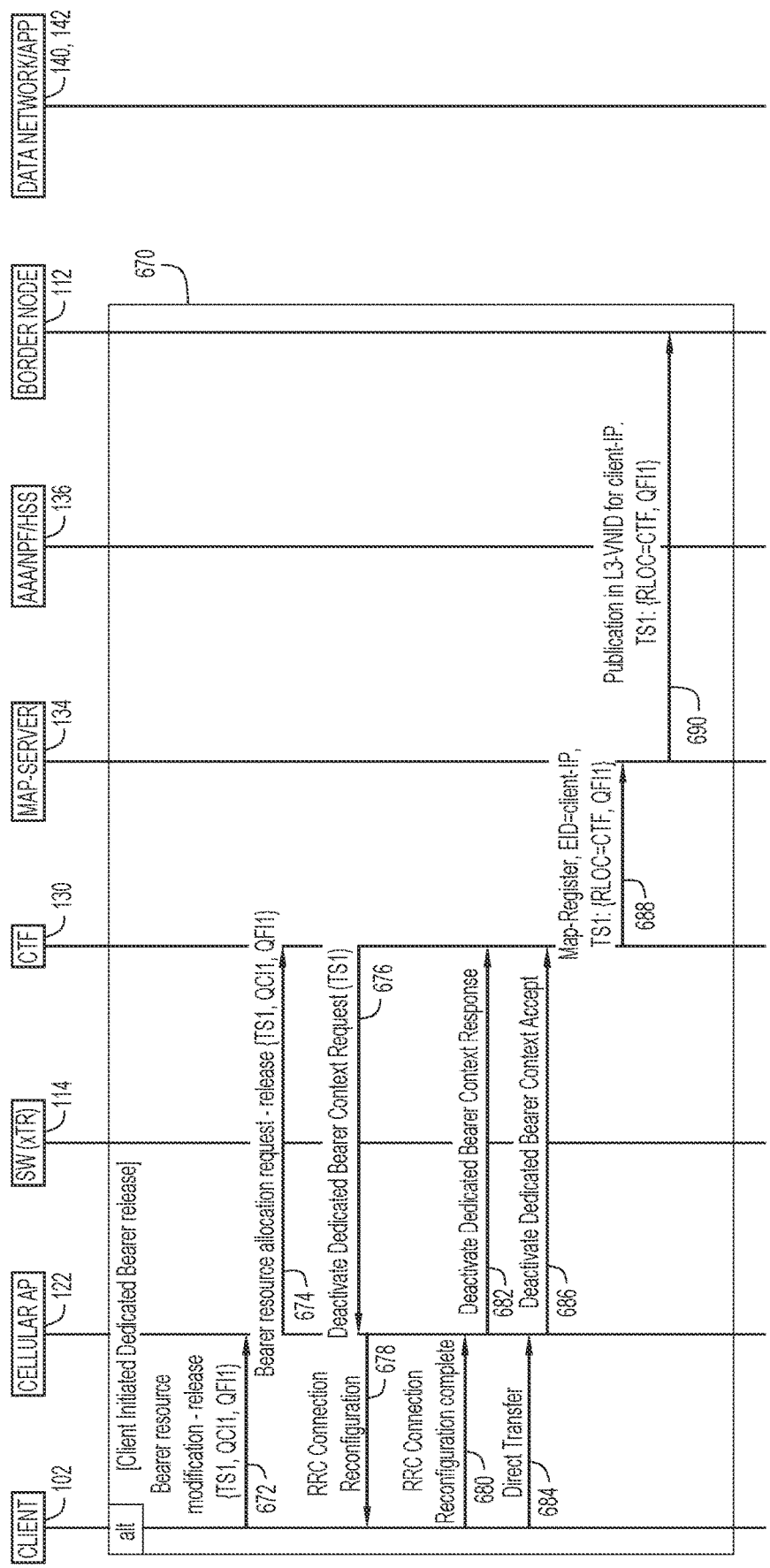

Referring to FIGS. 6A, 6B, and 6C, FIGS. 6A, 6B, and 6C are a message sequence diagram illustrating a call flow 600 associated with a client-initiated dedicated bearer that may be facilitated via system 100 of FIGS. 1A and 1B, according to an example embodiment. FIGS. 6A-6C include client 102, cellular AP 122, SW (xTR) 114, CTF 130, Map-Server 134, AAA/NPF/HSS 136, BN 112, and data network(s)/application(s) 140/142. For the embodiment of FIGS. 6A-6C, consider that cellular AP 122 may be a CBRS-enabled cellular AP.

At 602, CTF 130 is configured with QFTs for each APN supported by CTF 130 (e.g., as discussed above at 302 of FIG. 3A. At 604, cellular AP 122 is registered with CTF 130, as discussed above at 304 of FIG. 3A. For FIG. 6A, consider that a default bearer is established for client 102 at 606 and that EID-to-RLOC mapping information for the QFTs for client 102 is provided for Map-Server 134 at 608 and also for BN 112 at 610, which operations can be performed using techniques as discussed above for FIG. 3A.

Operations 620 illustrate example details associated with creating a dedicated bearer for client 102 based on a bearer resource allocation request being sent from client 102 to cellular AP 122 at 622 for a dedicated bearer associated with {TS1, QCI1, QFI1}, which cellular AP 122 communicates to CTF 130 at 624. At 626, CTF 130 determines the matching QFT from the allocation request, which triggers the dedicated bearer creation by CTF, as shown at operations 628, 630, 632, and 636, as discussed for other examples herein, except that the operations of FIG. 6A may be associated with the dedicated bearer having a RAB ID identified as RABID1 in which the cellular AP 122 may maintain a mapping between the client 102 IP address+QFI1 and RABID1 for the dedicated bearer, as shown at 634.

Based on receiving the ERAB setup response at 636, CTF 130 send a LISP Map Register communication to Map-Server 134 at 638 to update the EID-to-RLOC mapping for the EID=Client-IP for TS1 in which {RLOC=SW, QFI1, QCI1}. Based on the updated EID-to-RLOC mapping, Map-Server 134 communicates a Publication in the L3-VNID space for EID=Client IP maintained by BN 112 to install the Traffic Selector TS1 with {RLOC=SW. QFI1, QCI1}, as shown at 640.

Various additional dedicated bearer packet forwarding operations are illustrated in FIG. 6B at 650 including operations, 652, 654, 656, 658, 660, 662, and 664 which may be performed similar to other example packet forwarding operations discussed herein, except that the bearer indicator and QCI set for the dedicated bearer for operations 650 may be associated with TS1 (e.g., QCI1 and QFI1).

Various dedicated bearer termination operations are illustrate at 670 in FIG. 6C, which may be performed similar to other example bearer termination operations as discussed herein except that the operations at 670 may involve client 102 communicating a bearer resource modification release to cellular AP 122 at 672, which cellular AP 122 communicates to CTF 130 at 674; thereby triggering bearer termination operations for the dedicated bearer at 676, 678, 680, 682, 684, and 686, which causes CTF 130 to send a LISP Map Register communication to Map-Server 134 at 688 to update the EID-to-RLOC mapping for the EID=Client-IP for TS1 in which {RLOC=CTF, QFI1} (the default RLOC for the present example). Based on the updated EID-to-RLOC mapping, Map-Server 134 communicates a Publication in the L3-VNID space for EID=Client IP maintained by BN 112 to reflect the updated {RLOC=CTF, QFI1} for TS1, as shown at 690.

Accordingly, as shown in FIGS. 3, 4, 5, and 6 techniques herein may provide for extending a cellular QoS bearer through an enterprise fabric, such as enterprise fabric 110.

Although examples herein illustrate features associated with receiving downlink packets at BN 112 and forwarding the packets toward SW 114 for delivery to client 102, it is to be understood that packets may be forwarded across enterprise fabric 110 in a variety of directions. For example, uplink packets received from client 102 can be forwarded based on group access control lists or the like configured at SW 114, which may define access types, applications, locations, devices, etc. towards which uplink traffic from client 102 can be forwarded.

In another example, client-to-client communications can be provided via enterprise fabric 110 such that packets received at one edge/access switch that are to be delivered to another client attached to enterprise fabric 110 can be forwarded to the edge/access switch having connection the access point to which the other client is attached. End-to-end (e.g., client-to-client) QoS treatment for such traffic can be enforced via enterprise fabric 110 using techniques as discussed herein.

In addition to QoS bearer features as discussed herein, an edge/access switch, such as SW 114 may also perform features such as accounting. For example, SW 114 can generate reports that may include extensive details relating to flows, bandwidth consumed, etc. This data, when correlated with client session information, can be used to generate detailed reports on data consumption (potentially including much more detail than is typically included in 3GPP accounting). Additionally, in some embodiments features such as lawful intercept can be enabled on edge/access switches.

Figure 7:
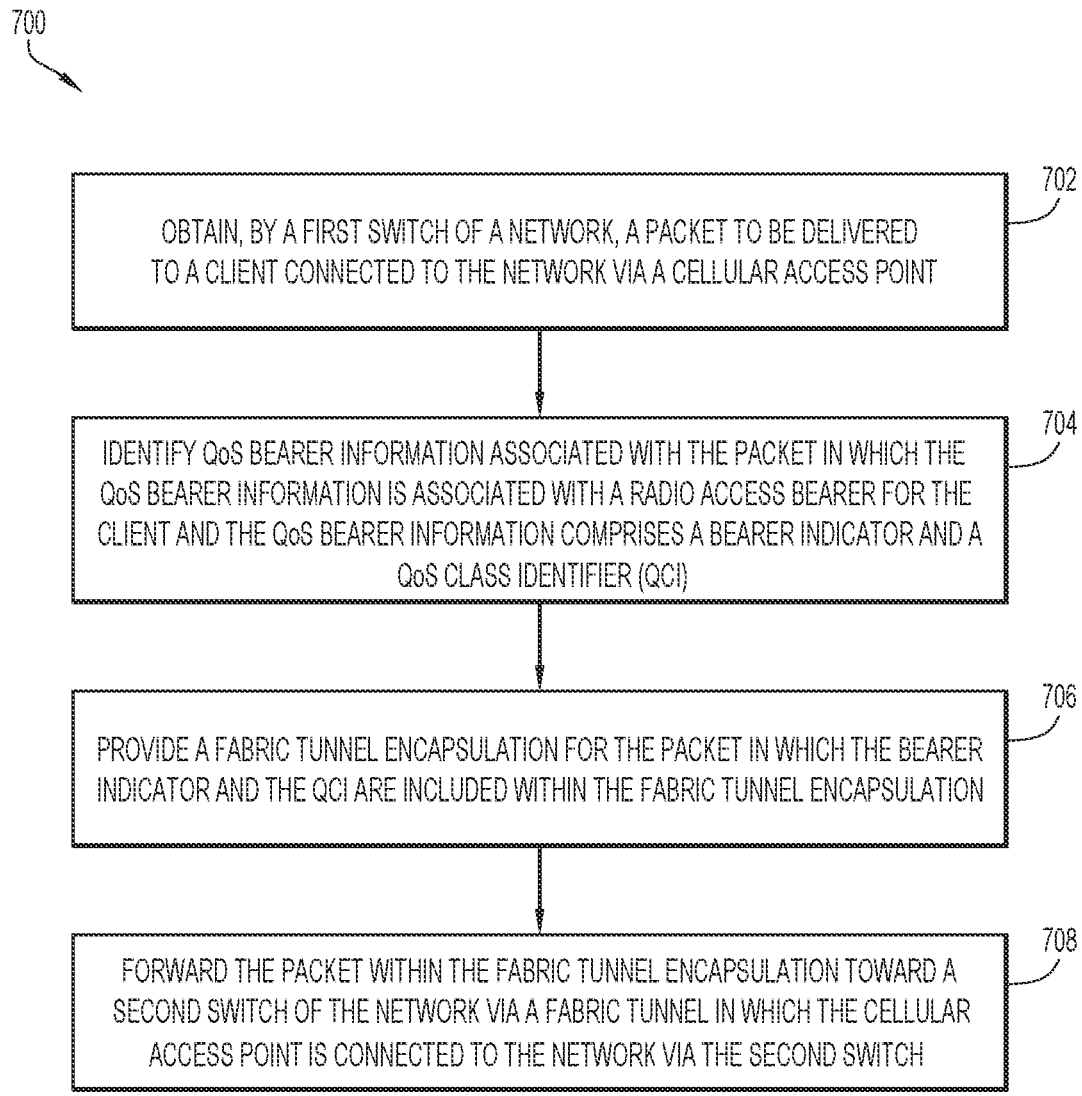
FIG. 7 is a flow chart depicting a method according to an example embodiment.

Referring to FIG. 7, FIG. 7 is a flowchart depicting a method 700 according to an example embodiment. In at least one embodiment, method 700 may be associated with operations that may be performed, at least in part, by an enterprise fabric data plane node that is configured on a border of a network (e.g., an enterprise fabric domain), such as border node 112 of enterprise fabric 110, that connects the network to one or more data networks in which the operations may be associated with forwarding a downlink packet across the enterprise fabric toward an edge switch of the enterprise fabric (e.g., SW 114) for delivery to a client (e.g., client 102), according to an example embodiment. In another embodiment, method 700 may be associated with operations that may be performed, at least in part, by an enterprise fabric data plane node that is configured on an edge of a network (e.g., an enterprise fabric domain), such as a first edge switch of enterprise fabric 110, in which the operations may be associated with forwarding a downlink packet sent from a first client across the enterprise fabric toward a second edge switch for delivery to a second client.

At 702, the method may include obtaining, by a first switch of a network (e.g., BN 114 of enterprise fabric 110), a packet that is to be delivered to a client connected to the network via a cellular access point (e.g., cellular AP 122). In one embodiment, the first switch may be configured with a plurality of traffic selectors that may be associated with QoS flow templates that may indicate a bearer indicator and a QCI for each of one or more bearers that may be established for the client. Additionally, the first switch may include EID-to-RLOC mappings associated with the client, which may, for example, be provided for the first switch via a Map-Server (e.g., Map-Server 134) of the network. In one embodiment, the packet may be a downlink packet received by the first switch.

At 704, the method may include the first switch identifying QoS bearer information associated with the packet in which the QoS bearer information is associated with a radio access bearer for the client and the QoS bearer information comprises a bearer indicator and a QoS class identifier (QCI). For example, the identifying at 704 may be based on classifying the packet to a bearer and identifying a QFT associated with the bearer based, at least in part, on the Traffic Selectors+IP address for the client (EID). In various embodiments, the bearer indicator may be a QFI, a GTP TEID, or the like.

At 706, the method may include the first switch providing a fabric tunnel encapsulation for the packet in which the bearer indicator and the QCI are included within the fabric tunnel encapsulation of the packet. In one embodiment, the bearer indicator may be set in a VXLAN header of the fabric tunnel encapsulation and the QCI may be encoded or otherwise set within a TOS/DSCP field of an outer IP header of the fabric tunnel encapsulation.

At 708, the method may include the first switch forwarding the packet within the fabric tunnel encapsulation toward a second switch of the network via a fabric tunnel of the network (e.g., via VXLAN fabric tunnel 118). The cellular access point to which the client is connected may be connected to the network via the second switch.

Figure 8:
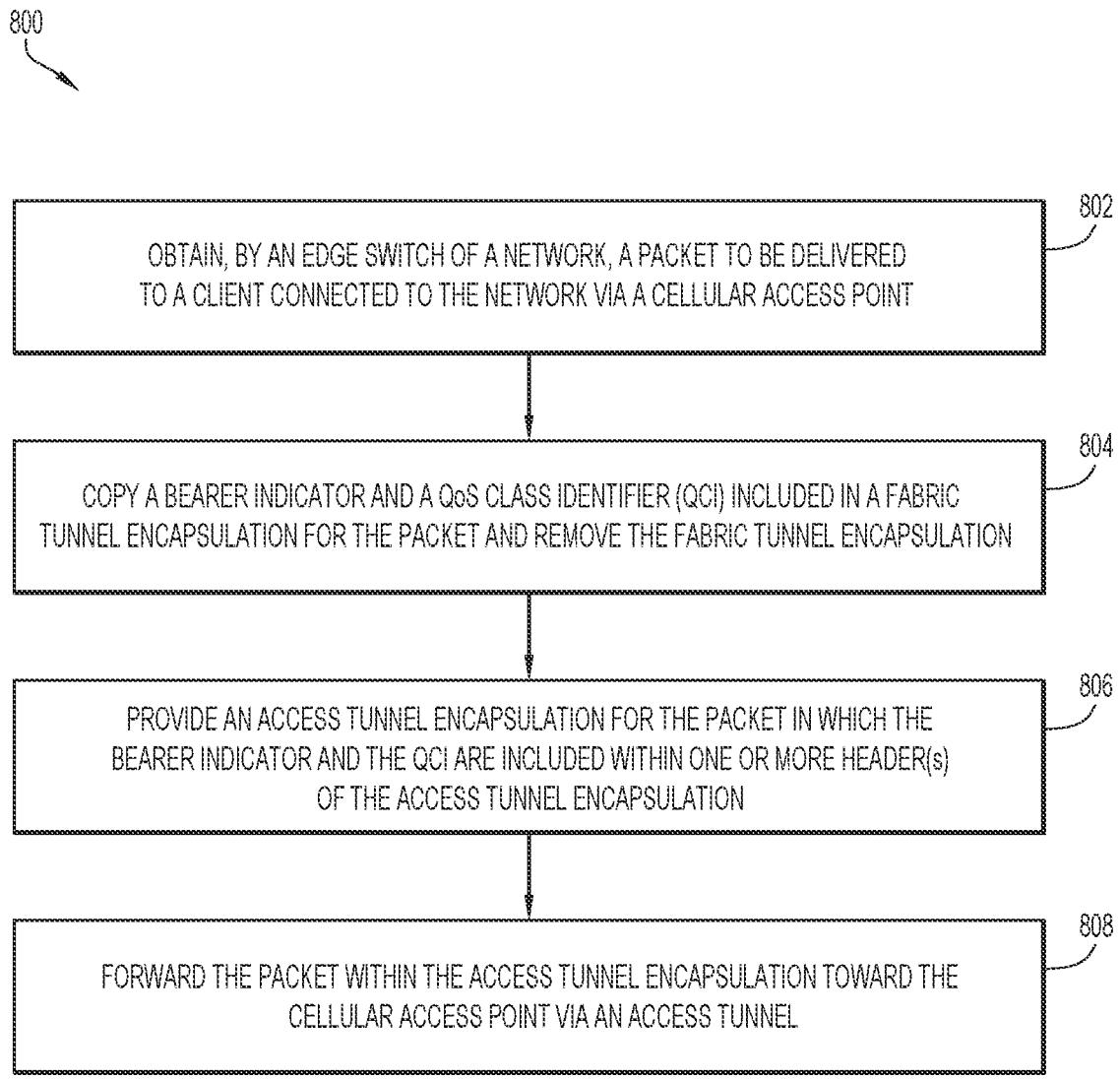
FIG. 8 is another flow chart depicting another method according to an example embodiment.

Referring to FIG. 8, FIG. 8 is a flowchart depicting another method 800 according to an example embodiment. In at least one embodiment, method 800 may be associated with operations that may be performed, at least in part, an enterprise fabric data plane node that is configured on an access network edge of a network (e.g., edge switch (SW) 114 of enterprise fabric 110), that connects the network to enterprise access network(s) in which the operations may be associated with forwarding a downlink packet to a cellular access point (e.g., cellular AP 122) connected to the edge switch, according to an example embodiment.

At 802, the method may include obtaining, by the edge switch of the network, a packet (e.g., a downlink packet) that is to be delivered to a client connected to the network via a cellular access point. The packet may be obtained via a tunnel (e.g., VXLAN fabric tunnel 118) in which the packet is encapsulated in a fabric tunnel encapsulation.

At 804, the method may include the edge switch copying a bearer indicator (e.g., QFI, TEID, etc.) and a QoS class identifier (QCI) included in the fabric tunnel encapsulation and removing the fabric tunnel encapsulation. At 806, the method may include the edge switch providing an access tunnel encapsulation (e.g., an access tunnel encapsulation)

for the packet in which the bearer indicator and the QCI marking are included within one or more header(s) of the access tunnel encapsulation (e.g., the bearer indicator included within a VXLAN header of the encapsulation and the QCI marking encoded within a TOS/DSCP field of an outer IP header of the access tunnel encapsulation). At 808, the method may include the edge switch forwarding the packet within the access tunnel encapsulation toward the cellular access point via an access tunnel.

Figure 9:
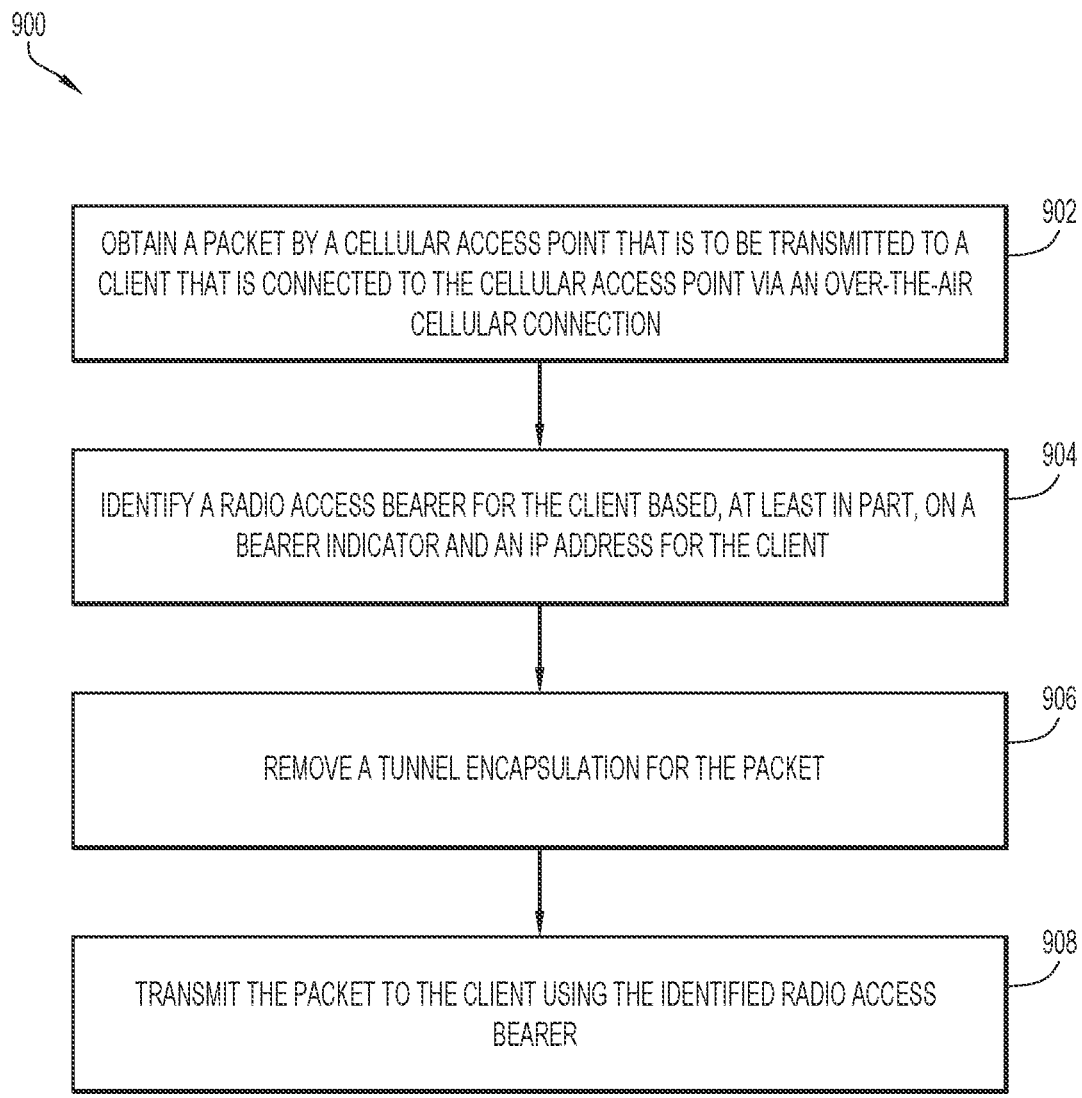
FIG. 9 is another flow chart depicting yet another method according to an example embodiment.

Referring to FIG. 9, FIG. 9 is a flowchart depicting another method 900 according to an example embodiment. In at least one embodiment, method 900 may be associated with operations that may be performed, at least in part, by an cellular access point connected to a network (e.g., cellular AP 122 connected to enterprise fabric 110 via SW 114) in which the operations may be associated with transmitting a downlink packet to a client via radio bearer providing connection between the cellular access point and the client, according to an example embodiment.

At 902, the method may include obtaining a packet (e.g., a downlink packet) by the cellular access point that is to be transmitted to a client connected to the cellular access point via an over-the-air cellular connection. The downlink packet may be obtained via an access tunnel for the network in which the packet is encapsulated within a tunnel encapsulation (e.g., an access tunnel encapsulation).

At 904, the method may include identifying a radio access bearer for the client based, at least in part, on a bearer indicator and an IP address for the client. In at least one embodiment, the bearer indicator (e.g., QFI, TEID, etc.) may be included within the tunnel encapsulation (e.g., within a VXLAN header of the encapsulation) for the packet. The IP address for the client may be included within an IP header of the packet itself (e.g., the destination IP address field of the packet). The cellular access point may maintain a mapping of at least one of the client IP address and/or the client MAC address (e.g., vMAC address) and each of one or more corresponding bearer indicators in association with each of one or more radio access bearers established for the client with the cellular access point in which each radio access bearer may be identified by a corresponding RAB ID.

At 906, the method may include removing the tunnel encapsulation for the packet. At 908, the method may include the cellular access point transmitting the packet to the client using the identified radio access bearer.

Figure 10:
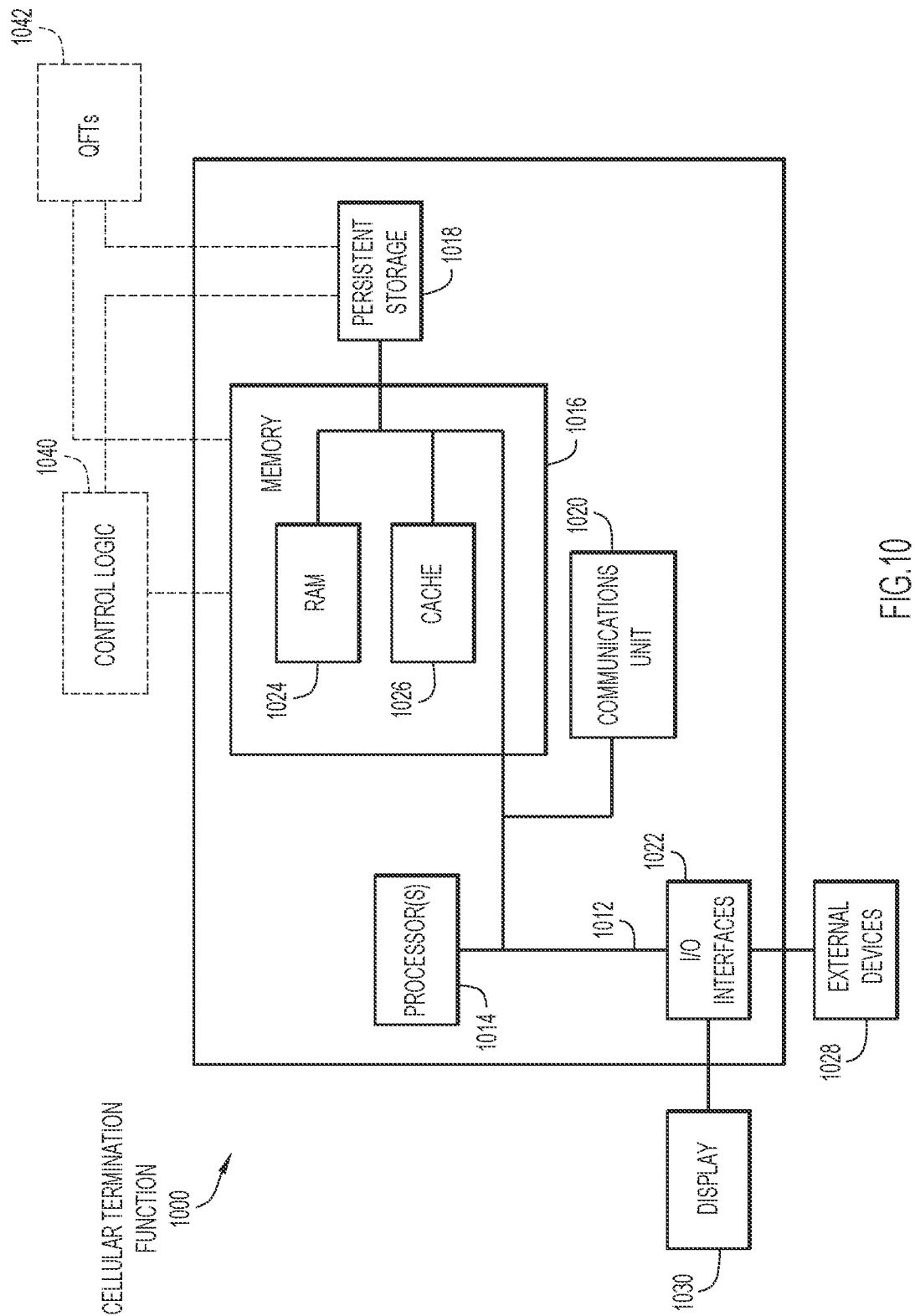
FIG. 10 is a hardware block diagram of a cellular termination function that may participate in operations described herein, according to an example embodiment.

Referring to FIG. 10, FIG. 10 is a hardware block diagram of a cellular termination function 1000 that may participate in operations associated with extending cellular QoS bearers through an enterprise fabric, according to an example embodiment. In at least one embodiment, cellular termination function 1000 may be representative of a configuration of CTF 130 of FIGS. 1A and 1B discussed herein. It should be appreciated that FIG. 10 provides only an illustration of one embodiment and does not imply any limitations with regard to the environments in which different embodiments may be implemented. Many modifications to the depicted environment may be made.

As depicted, the cellular termination function 1000 includes a bus 1012, which provides communications between computer processor(s) 1014, memory 1016, persistent storage 1018, communications unit 1020, and input/output (I/O) interface(s) 1022. Bus 1012 can be implemented with any architecture designed for pas sing data and/or control information between processors (such as microprocessors, communications and network processors, etc.), system memory, peripheral devices, and any other hardware components within a system. For example, bus 1012 can be implemented with one or more buses.

Memory 1016 and persistent storage 1018 are computer readable storage media, which can be inclusive on non-transitory computer readable storage media. In the depicted embodiment, memory 1016, which may be inclusive of one or more memory element(s), may include random access memory (RAM) 1024 and cache memory 1026. In general, memory 1016 can include any suitable volatile or non-volatile computer readable storage media. Instructions for control logic 1040 may be stored in memory 1016 and/or persistent storage 1018 for execution by processor(s) 1014. When the processor(s) 1014 execute control logic 1040, the processor(s) 1014 are caused to perform the operations described herein in with connection extending cellular QoS bearers through an enterprise fabric (e.g., registering a cellular AP within the enterprise fabric, generating a vMAC for a client, obtaining cellular and enterprise policy information for a client, triggering bearer creation/deletion for the client, registering EID-to-RLOC mapping information for the client within a Map-Server, combinations thereof, and/or the like as discussed herein). In at least one embodiment, one or more QFTs 1042 may also be stored and/or configured within memory 1016 and/or persistent storage 1018 to facilitate operations described herein.

One or more programs and/or other logic may be stored in persistent storage 1018 for execution by one or more of the respective computer processors 1014 via one or more memory elements of memory 1016. The persistent storage 1018 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1018 may also be removable. For example, a removable hard drive may be used for persistent storage 1018. Other examples include optical and magnetic disks, thumb drives, and smart cards that are inserted into a drive for transfer onto another computer readable storage medium that is also part of persistent storage 1018.

Communications unit 1020, in these examples, provides for communications with other data processing systems or devices (e.g., via any appropriate interfaces). Communications unit 1020 may provide communications through the use of either or both physical and wireless communications links.

I/O interface(s) 1022 allows for input and output of data with other devices that may be connected to cellular termination function 1000. For example, I/O interface 1022 may provide a connection to external devices 1028 such as a keyboard, keypad, a touch screen, and/or some other suitable input device. External devices 1028 can also include portable computer readable storage media such as database systems, thumb drives, portable optical or magnetic disks, and memory cards.

Software and data used to practice embodiments can be stored on such portable computer readable storage media and can be loaded onto persistent storage 1018 via I/O interface(s) 1022. I/O interface(s) 1022 may also connect to a display 1030. Display 1030 provides a mechanism to display data to a user and may be, for example, a computer monitor.

Figure 11:
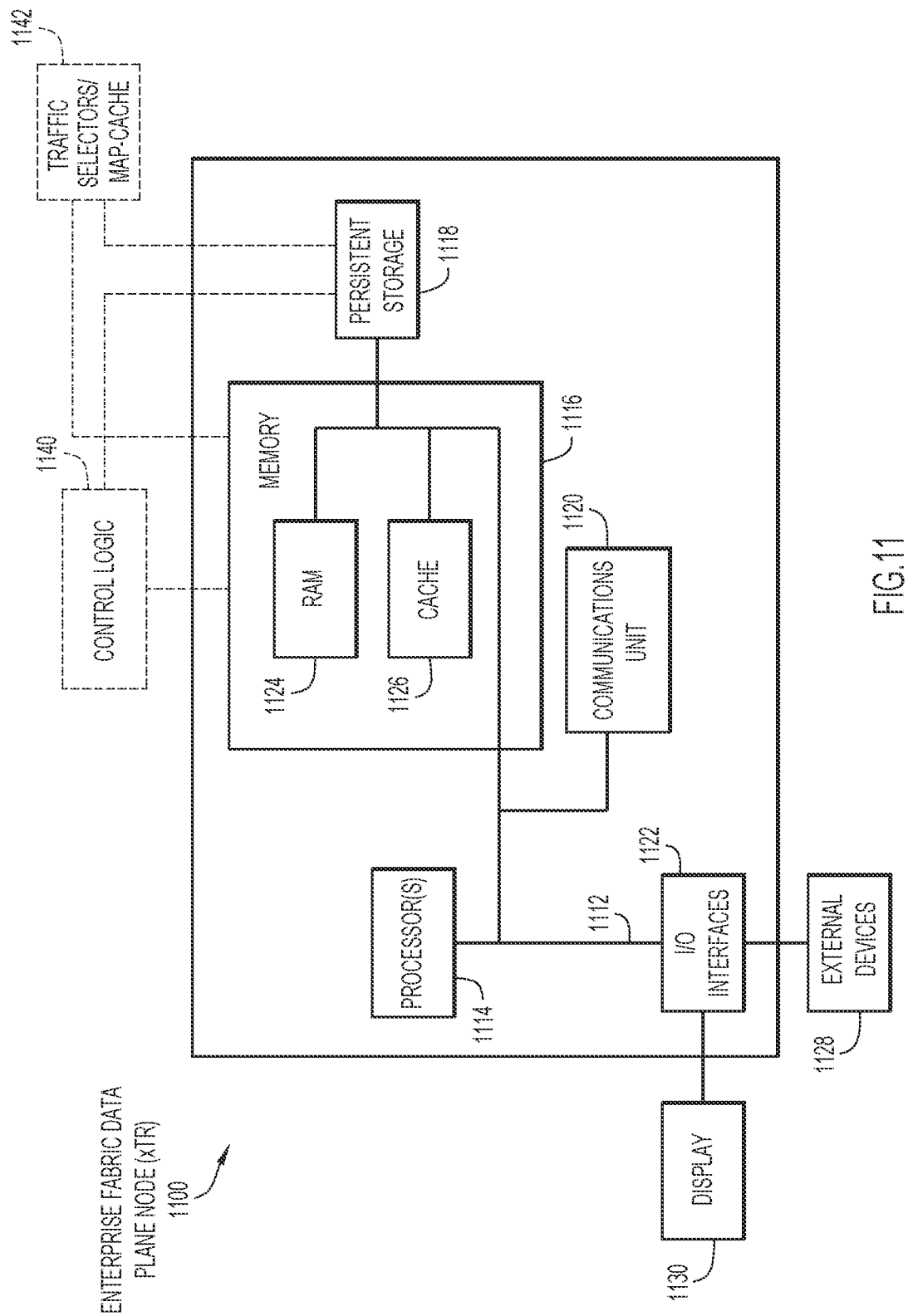
FIG. 11 is a hardware block diagram of an enterprise fabric data plane node that may participate in operations described herein, according to an example embodiment.

Referring to FIG. 11, FIG. 11 is a hardware block diagram of an enterprise fabric data plane node 1100 that may participate in operations associated with extending cellular QoS bearers through an enterprise fabric, according to an example embodiment. In at least one embodiment, enterprise fabric data plane node 1100 may be representative of a configuration of node that may provide xTR routing functionality (e.g., ingress/egress routing) for an enterprise fabric such as BN 112 or SW 114 of FIGS. 1A and 1B discussed herein. It should be appreciated that FIG. 11 provides only an illustration of one embodiment and does not imply any limitations with regard to the environments in which different embodiments may be implemented. Many modifications to the depicted environment may be made.

As depicted, the enterprise fabric data plane node 1100 includes a bus 1112, which provides communications between computer processor(s) 1114, memory 1116, persistent storage 1118, communications unit 1120, and input/output (I/O) interface(s) 1122. Bus 1112 can be implemented with any architecture designed for passing data and/or control information between processors (such as microprocessors, communications and network processors, etc.), system memory, peripheral devices, and any other hardware components within a system. For example, bus 1012 can be implemented with one or more buses.

Memory 1116 and persistent storage 1118 are computer readable storage media, which can be inclusive on non-transitory computer readable storage media. In the depicted embodiment, memory 1116, which may be inclusive of one or more memory element(s), may include random access memory (RAM) 1124 and cache memory 1126. In general, memory 1116 can include any suitable volatile or non-volatile computer readable storage media. Instructions for control logic 1140 may be stored in memory 1116 and/or persistent storage 1118 for execution by processor(s) 1114. In at least one embodiment, one or more Traffic Selectors for a local map-cache (Traffic Selectors/map-cache) 1142 may also be stored and/or configured within memory 1016 and/or persistent storage 1018 to facilitate operations described herein. When the processor(s) 1114 execute control logic 1140, the processor(s) 1114 are caused to perform the operations described herein in connection with extending cellular QoS bearers through an enterprise fabric (e.g., maintaining/updating a Traffic Selectors/local map-cache 1142 for one or more EID-to-RLOC mappings for one or more clients/endpoints, identifying/matching Traffic Selectors for corresponding QFTs to downlink packets received for a client, providing VXLAN tunnel encapsulations for packets including setting a bearer indicator and QCI for such encapsulated packets, forwarding encapsulated packets to a corresponding RLOC for any combination of packet delivery to a client and/or to trigger bearer creation (e.g., for dedicated bearers), triggering bearer deactivation, sending control plane communications to trigger bearer creation, combinations thereof, and/or the like as discussed herein).

One or more programs and/or other logic may be stored in persistent storage 1118 for execution by one or more of the respective computer processors 1114 via one or more memory elements of memory 1116. The persistent storage 1118 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1118 may also be removable. For example, a removable hard drive may be used for persistent storage 1118. Other examples include optical and magnetic disks, thumb drives, and smart cards that are inserted into a drive for transfer onto another computer readable storage medium that is also part of persistent storage 1118.

Communications unit 1120, in these examples, provides for communications with other data processing systems or devices (e.g., via any appropriate interfaces). Communications unit 1120 may provide communications through the use of either or both physical and wireless communications links.

I/O interface(s) 1122 allows for input and output of data with other devices that may be connected to enterprise fabric data plane node 1100. For example, I/O interface 1122 may provide a connection to external devices 1128 such as a keyboard, keypad, a touch screen, and/or some other suitable input device. External devices 1128 can also include portable computer readable storage media such as database systems, thumb drives, portable optical or magnetic disks, and memory cards.

Software and data used to practice embodiments can be stored on such portable computer readable storage media and can be loaded onto persistent storage 1118 via I/O interface(s) 1122. I/O interface(s) 1122 may also connect to a display 1130. Display 1130 provides a mechanism to display data to a user and may be, for example, a computer monitor.

In various embodiments, any other element, function, node, etc. discussed for embodiments described herein (e.g., client 102, cellular AP 122, WLC 132, Map-Server 134, and AAA/NPF/HSS 136) may be configured with any combination of appropriate hardware (e.g., processor(s), memory element(s) etc.), software, logic, and/or the like similar to that as described for FIG. 11. In addition, in some embodiments, air interface devices such as client 102, cellular AP 122 and/or the like discussed herein may additionally and/or alternatively include any other hardware, software, logic, and/or the like (e.g., RF receivers, RF transmitters, RF transceivers, antennas and/or antenna arrays, baseband processors (modems), etc.) in order to perform operations as discussed for various embodiments described herein.

In summary, presented herein are techniques for providing dynamic QoS support to a client connected to an enterprise private access (e.g., cellular) network of an enterprise fabric (e.g., enterprise fabric 110). Techniques presented herein provide interworking between enterprise fabric data and control plane elements as well as between a cellular control plane function (e.g., CTF 130) to provide for the creation and/or deletion of radio and core network QoS bearer(s) by extending the manner in which the LISP control plane is used for an SDA/enterprise fabric. With these extensions, a QoS bearer (e.g., a certain QoS classification) can be extended from a client to the enterprise fabric domain border, thereby, providing end-to-end QoS and bringing a unique value to the enterprise fabric.

Stated differently, techniques presented herein may provide for various features including, but not limited to: extending an enterprise fabric architecture with 3GPP QoS with QoS handling for packet data flows between a client all the way to a border node of the fabric; mapping radio bearers with core network QoS IP bearers; associating RLOCs on an EID+TS basis; setting the cellular termination function or border node as the RLOC for non-existing flows that involve a specific QoS; steering a first packet to the cellular termination function or control plane messaging to the cellular termination function and using this as a trigger for radio access bearer and end-to-end bearer creation; changing an RLOC after bearer creation; providing extensions to the VXLAN headers with QFI/QCI markings; associating packets to an appropriate bearer and steering such packets towards the edge switch; and/or associating packets received from a VXLAN tunnel and mapping such packets to radio access bearers for transmitting such packets to a client.

In one form, a computer-implemented method is provided that may include obtaining, by a first switch of a network, a packet to be delivered to a client connected to the network via a cellular access point; identifying quality of service (QoS) bearer information associated with the packet, wherein the QoS bearer information is associated with a radio access bearer for the client and the QoS bearer information comprises a bearer indicator and a QoS class identifier; providing a fabric tunnel encapsulation for the packet, wherein the bearer indicator and the QoS class identifier are included within the fabric tunnel encapsulation of the packet; and forwarding the packet within the fabric tunnel encapsulation toward a second switch of the network via a fabric tunnel, wherein the cellular access point is connected to the network via the second switch.

In one instance, the method may include, prior to obtaining the packet at the first switch, provisioning the first switch with the QoS bearer information, wherein the QoS bearer information comprises a plurality of bearer indicators and a plurality QoS class identifiers for a plurality of radio access bearers that can be established for the client. In at least one implementation, the provisioning at the first switch may be provided by a Locator/Identity Separation Protocol (LISP) Map-Server of the network. In at least one implementation, the QoS bearer information comprises one or more QoS policies, the method further comprising enforcing the one or more QoS policies for the packet at the first switch. The first switch may interface with one or more data networks external to the network.

In at least one implementation, cellular access point may maintain bearer mapping information for the client, wherein the bearer mapping information comprises at least one of an Internet Protocol (IP) address of the client and a Media Access Control (MAC) address of the client and the bearer indicator that are mapped to a corresponding radio access bearer identifier for the radio access bearer established for the client. In various implementations, the bearer indicator may be one of a QoS Flow Index value and a General Packet Radio Service (GPRS) Tunneling Protocol (GTP) Tunnel Endpoint Identifier (TEID).

In at least one implementation, the fabric tunnel encapsulation may be a virtual extensible local area network (VXLAN) tunnel encapsulation. In at least one implementation, the VXLAN tunnel encapsulation for the packet may include a Media Access Control (MAC) header, an Internet Protocol (IP) header, and a VXLAN header in which the bearer indicator is provided in the VXLAN header and the QoS class identifier is included in the IP header.

In at least one implementation, the method may include obtaining the packet by the second switch via the fabric tunnel; copying the bearer indicator and the QoS class identifier and removing the fabric tunnel encapsulation for the packet; providing an access tunnel encapsulation for the packet, wherein the bearer indicator and the QoS class identifier are included within one or more headers of the access tunnel encapsulation; and forwarding the packet within the access tunnel encapsulation toward the cellular access point via an access tunnel. In at least one implementation, the method may include obtaining the packet by the cellular access point; identifying the radio access bearer for the client based on the bearer indicator and an Internet Protocol (IP) address for the client; removing the access tunnel encapsulation for the packet; and transmitting the packet to the client using the radio access bearer.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. In general, packet is a formatted unit of data that can contain control or routing information (e.g., source and destination address, source and destination port, etc.) and a payload (e.g., data, signaling, instructions, and/or the like), which is also sometimes referred to as a data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to client access profiles, policy information, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), wireless LAN (WLAN), Wide Area Network (WAN), Ethernet network, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WLAN, WAN, Ethernet network, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, WLAN, hardwire, wireless link, Ethernet network, Intranet, etc.).

A system or computing device may employ any number of any conventional or other databases, data stores or storage structures (e.g., files, databases, data structures, data or other repositories, etc.) to store information (e.g., data relating to client access profiles, policy information, fabric identifiers, RLOCs, EIDs, etc.). The database system may be implemented by any number of any conventional or other databases, data stores or storage structures (e.g., files, databases, data structures, data or other repositories, etc.) to store information (e.g., data relating to client access profiles, policy information, fabric identifiers, RLOCs, EIDs, etc.). A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ and/or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

maintaining, at an edge network device, one or more access tunnels over an enterprise network with a cellular access point of an enterprise private cellular access network;

maintaining, at the edge network device, a Virtual Extensible Local Area Network (VXLAN) fabric tunnel with a remote network device of the enterprise network;

maintaining, at the cellular access point, a plurality of radio bearers with each one of a plurality of user equipments (UEs), wherein the plurality of radio bearers include a first radio bearer and a second radio bearer associated with a first UE of the plurality of UEs;

providing to the remote network device, by the edge network device, information associating the first UE with the VXLAN fabric tunnel;

maintaining at the edge network device, a plurality of Quality of Service (QoS) bearers for each of the plurality of UEs, wherein each of the plurality of QoS bearers is associated with a QoS classification and an application type of a plurality of application types;

wherein a first QoS bearer of the plurality of QoS bearers is associated with the first UE and maps to the first radio bearer between the first UE and the cellular access point; and wherein a second QoS bearer of the plurality of QoS bearers is associated with the first UE and maps to the second radio bearer between the first UE and the cellular access point;

receiving, on the VXLAN fabric tunnel at the edge network device, a packet from the remote network device of the enterprise network, the packet to be delivered to the first UE, wherein the packet includes QoS information and an identifier associated with the first UE;

mapping the packet to the first QoS bearer or the second QoS bearer based at least on the QoS information and the identifier associated with the first UE;

encapsulating the packet with a tunnel header for transmission across a first access tunnel of the one or more access tunnels to the cellular access point, wherein the tunnel header includes bearer information corresponding to the mapped one of the first or second QoS bearer; and forwarding the encapsulated packet within the first access tunnel to the cellular access point;

receiving, at the cellular access point, the encapsulated packet;

removing the tunnel header from the packet;

mapping the packet to the first or second radio bearer based on the bearer information; and transmitting the packet to the first UE using the mapped one of the first or second radio bearer.

2. The method of claim 1, wherein the remote network device is a border node of the enterprise network.

3. The method of claim 1, wherein the first radio bearer is a default radio bearer and the second radio bearer is a dedicated radio bearer.

4. The method of claim 1, wherein the identifier associated with the first UE comprises an Internet Protocol (IP) address.

5. The method of claim 1, wherein the identifier associated with the first UE comprises a Media Access Control (MAC) address.

6. The method of claim 1, wherein the QoS information comprises a bearer indicator and a QoS indicator.

7. The method of claim 6, wherein the bearer indicator is one of:
a QoS Flow Index value; or
a General Packet Radio Service (GPRS) Tunneling Protocol (GTP) Tunnel Endpoint Identifier (TEID).

8. The method of claim 1, wherein the QoS information comprises information associated with an application.

9. The method of claim 1, wherein the enterprise private cellular access network comprises a 5G cellular network or a Citizens Broadband Radio Services (CBRS) network.

10. A system comprising:
an edge network device and a cellular access point of an enterprise private cellular access network;
wherein the cellular access point comprises at least one memory element for storing first data; and
at least one processor for executing instructions associated with the first data, wherein executing the instructions causes the cellular access point to perform operations, comprising:
maintaining a plurality of radio bearers with each one of a plurality of user equipments (UEs), wherein the plurality of radio bearers include a first radio bearer and a second radio bearer associated with a first UE of the plurality of UEs;
wherein the edge network device comprises at least one memory element for storing second data; and
at least one processor for executing instructions associated with the second data, wherein executing the instructions causes the edge network device to perform operations, comprising:
maintaining one or more access tunnels over an enterprise network with the cellular access point;
maintaining a Virtual Extensible Local Area Network (VXLAN) fabric tunnel with a remote network device of the enterprise network;
providing, to the remote network device, information associating the first UE with the VXLAN fabric tunnel;
maintaining at the edge network device, a plurality of Quality of Service (QoS) bearers for each of the plurality of UEs, wherein each of the plurality of QoS bearers is associated with a QoS classification and an application type of a plurality of application types;
wherein a first QoS bearer of the plurality of QoS bearers is associated with the first UE and maps to the first radio bearer between the first UE and the cellular access point; and
wherein a second QoS bearer of the plurality of QoS bearers is associated with the first UE and maps to the second radio bearer between the first UE and the cellular access point;
receiving, on the VXLAN fabric tunnel a packet from the remote network device of the enterprise network, the packet to be delivered to the first UE, wherein the packet includes QoS information and an identifier associated with the first UE;
mapping the packet to the first QoS bearer or the second QoS bearer based at least on the QoS information and the identifier associated with the first UE;
encapsulating the packet with a tunnel header for transmission across a first access tunnel of the one or more access tunnels to the cellular access point, wherein the tunnel header includes bearer information corresponding to the mapped one of the first or second QoS bearer; and
forwarding the encapsulated packet within the first access tunnel to the cellular access point;
wherein the cellular access point executing the instructions causes the cellular access point to perform additional operations, comprising:
receiving the encapsulated packet;
removing the tunnel header from the packet;
mapping the packet to the first or second radio bearer based on the bearer information; and
transmitting the packet to the first UE using the mapped one of the first or second radio bearer.

11. The system of claim 10, wherein the remote network device is a border node of the enterprise network.

12. The system of claim 10, wherein the first radio bearer is a default radio bearer and the second radio bearer is a dedicated radio bearer.

13. The system of claim 10, wherein the identifier associated with the first UE comprises an Internet Protocol (IP) address.

14. The system of claim 10, wherein the identifier associated with the first UE comprises a Media Access Control (MAC) address.

15. The system of claim 10, wherein the QoS information comprises a bearer indicator and a QoS indicator.

16. The system of claim 15, wherein the bearer indicator is one of:
a QoS Flow Index value; or
a General Packet Radio Service (GPRS) Tunneling Protocol (GTP) Tunnel Endpoint Identifier (TEID).

17. The system of claim 10, wherein the QoS information comprises information associated with an application.

18. The system of claim 10, wherein the enterprise private cellular access network comprises a 5G cellular network or a Citizens Broadband Radio Services (CBRS) network.

19. One or more non-transitory computer readable storage media encoded with instructions that, when executed by a processor of an edge network device, cause the processor to perform operations, comprising:
maintaining, at the edge network device, one or more access tunnels over an enterprise network with a cellular access point of an enterprise private cellular access network, wherein the cellular access point is operative to maintain a plurality of radio bearers with each one of a plurality of user equipments (UEs), wherein the plurality of radio bearers include a first radio bearer and a second radio bearer associated with a first UE of the plurality of UEs;

maintaining, at the edge network device, a Virtual Extensible Local Area Network (VXLAN) fabric tunnel with a remote network device of the enterprise network;

providing, to the remote network device, information associating the first UE with the VXLAN fabric tunnel;

maintaining at the edge network device, a plurality of Quality of Service (QoS) bearers for each of the plurality of UEs, wherein each of the plurality of QoS bearers is associated with a QoS classification and an application type of a plurality of application types;

wherein a first QoS bearer of the plurality of QoS bearers is associated with the first UE and maps to the first radio bearer between the first UE and the cellular access point; and wherein a second QoS bearer of the plurality of QoS bearers is associated with the first UE and maps to the second radio bearer between the first UE and the cellular access point;

receiving, on the VXLAN fabric tunnel, a packet from the remote network device of the enterprise network, the packet to be delivered to the first UE, wherein the packet includes QoS information and an identifier associated with the first UE;

mapping the packet to the first QoS bearer or the second QoS bearer based at least on the QoS information and the identifier associated with the first UE;

encapsulating the packet with a tunnel header for transmission across a first access tunnel of the one or more access tunnels to the cellular access point, wherein the tunnel header includes bearer information corresponding to the mapped one of the first or second QoS bearer; and forwarding the encapsulated packet within the first access tunnel to the cellular access point;

wherein the encapsulated packet causes the cellular access point to perform operations, comprising:
  receiving the encapsulated packet;
  removing the tunnel header from the packet;
  mapping the packet to the first or second radio bearer based on the bearer information; and
  transmitting the packet to the first UE using the mapped one of the first or second radio bearer.

20. The media of claim 19, wherein the remote network device is a border node of the enterprise network.

21. The media of claim 19, wherein the first radio bearer is a default radio bearer and the second radio bearer is a dedicated radio bearer.

22. The media of claim 19, wherein the identifier associated with the first UE comprises an Internet Protocol (IP) address.

23. The media of claim 19, wherein the identifier associated with the first UE comprises a Media Access Control (MAC) address.

24. The media of claim 19, wherein the QoS information comprises a bearer indicator and a QoS indicator.

25. The media of claim 24 wherein the bearer indicator is one of:
  a QoS Flow Index value; or
  a General Packet Radio Service (GPRS) Tunneling Protocol (GTP) Tunnel Endpoint Identifier (TEID).

26. The media of claim 19, wherein the QoS information comprises information associated with an application.

27. The media of claim 19, wherein the enterprise private cellular access network comprises a 5G cellular network or a Citizens Broadband Radio Services (CBRS) network.

* * * * *